(12) United States Patent
Lee et al.

(10) Patent No.: US 11,917,199 B2
(45) Date of Patent: Feb. 27, 2024

(54) IMAGE ENCODING/DECODING METHODS AND APPARATUSES

(71) Applicant: INTELLECTUAL DISCOVERY CO., LTD., Seoul (KR)

(72) Inventors: Bae Keun Lee, Seongnam-si (KR); Dong San Jun, Changwon-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 18/051,475

(22) Filed: Oct. 31, 2022

(65) Prior Publication Data

US 2023/0109828 A1 Apr. 13, 2023

Related U.S. Application Data

(63) Continuation of application No. 17/283,130, filed as application No. PCT/KR2019/013341 on Oct. 11, 2019, now Pat. No. 11,516,507.

(30) Foreign Application Priority Data

Oct. 12, 2018 (KR) .......................... 10-2018-0121738
Mar. 11, 2019 (KR) .......................... 10-2019-0027607

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/11* (2014.11);
(Continued)

(58) Field of Classification Search
CPC .... H04N 19/122; H04N 19/132; H04N 19/12; H04N 19/70; H04N 19/11; H04N 19/117;
(Continued)

(56) References Cited

U.S. PATENT DOCUMENTS

| | | |
|---|---|---|
| 2014/0133558 A1 | 5/2014 | Seregin et al. |
| 2017/0332084 A1 | 11/2017 | Seregin et al. |
| 2019/0116381 A1 | 4/2019 | Lee et al. |

FOREIGN PATENT DOCUMENTS

| | | |
|---|---|---|
| CN | 107925759 A | 4/2018 |
| CN | 108141585 A | 6/2018 |

(Continued)

OTHER PUBLICATIONS

Santiago De Luxan Hernandez et al., "CE3: Line-based intra coding mode (Tests 2.1.1. and 2.1.2)", JVET-L0076-v2, Joint Video Experts Team(JVET) of ITU-T SG 16 WP 3 and ISO/IEC JTC 1/SC 29/WG 11, 12th Meeting: Macao, CN, Sep. 30, 2018, pp. 1-9.
Alexey Filippov et al., "CE3.7.2: Distance-Weighted Directional Intra Prediction (DWDIP)", JVET-K0045-v2, Joint Video Experts Team (JVET) of ITU-T SG 16 WP3 and ISO/IEC JTC 1/SC 29/WG 11, 11th Meeting: Ljubljana, SI, Jul. 9, 2018, pp. 1-4.
International Search Report for PCT/KR2019/013341 dated Jan. 22, 2020 [PCT/ISA/210].
(Continued)

*Primary Examiner* — Neil R Mikeska
(74) *Attorney, Agent, or Firm* — BROADVIEW IP LAW, PC

(57) ABSTRACT

Image encoding/decoding methods and apparatuses according to the present invention may generate a prediction block of a current block based on a pre-defined prediction mode, generate a transform block of the current block through predetermined transformation, and reconstruct the current block based on the prediction block and the transform block.

12 Claims, 26 Drawing Sheets

(51) Int. Cl.
- *H04N 19/11* (2014.01)
- *H04N 19/119* (2014.01)
- *H04N 19/122* (2014.01)
- *H04N 19/129* (2014.01)
- *H04N 19/132* (2014.01)
- *H04N 19/176* (2014.01)

(52) U.S. Cl.
CPC ......... *H04N 19/119* (2014.11); *H04N 19/122* (2014.11); *H04N 19/132* (2014.11); *H04N 19/176* (2014.11); *H04N 19/129* (2014.11)

(58) Field of Classification Search
CPC .. H04N 19/593; H04N 19/119; H04N 19/176; H04N 19/129
See application file for complete search history.

(56) References Cited

FOREIGN PATENT DOCUMENTS

| | | |
|---|---|---|
| CN | 108293137 A | 7/2018 |
| KR | 10-2018-0040319 A | 4/2018 |
| WO | 2017/176030 A1 | 10/2017 |

OTHER PUBLICATIONS

Examination Report for IN202117020736 by Intellectual Property India dated Dec. 19, 2022.

Filippov, Alexey et al. CE3: Distance-Weighted Directional Intra Prediction (Tests 4.1.1 and 4.1.2). JVETL0284-vl. Joint Video Experts Team (JVET) of ITU-T SG 16 WP 3 and ISO/IEC JTC 1/SC 29/WG 11. 12th Meeting: Macau, China.

Office Action for CN 201980067154.3 by China National Intellectual Property Administration dated Jul. 17, 2023.

Rotation　　　　　　　　　　Zoom-in

Zoom-out　　　　　　　　　Affine transform

FIG. 25

| -1 | 0 | -1 | 0 |
|---|---|---|---|
| 1  | 0 | 0  | 0 |
| 2  | 0 | 0  | 0 |

1x4 sub-block, Number of non-zero coefficients in horizontal direction : 2

1x4 sub-block, Number of non-zero coefficients in horizontal direction : 1
Maximum number of non-zero coefficients in horizontal direction : 2

IMAGE ENCODING/DECODING METHODS AND APPARATUSES

CROSS-REFERENCE TO RELATED APPLICATIONS

This application is a continuation of pending U.S. application Ser. No. 17/283,130 filed on Apr. 6, 2021, which is a national stage entry of an expired PCT Application No. PCT/KR2019/013341 filed on Oct. 11, 2019, which claims priority to Korean Application No. 10-2018-0121738 filed on Oct. 12, 2018 and Korean Application No. 10-2019-0027607 filed on Mar. 11, 2019, the entire contents of which are hereby incorporated by reference.

TECHNICAL FIELD

The present disclosure relates to a video signal processing method and device.

BACKGROUND ART

As a market demand for a high-resolution video has increased, a technology which may effectively compress a high resolution image is necessary. According to such a market demand, MPEG (Moving Picture Expert Group) of ISO/IEC and VCEG (Video Coding Expert Group) of ITU-T jointly formed JCT-VC (Joint Collaborative Team on Video Coding) to develop HEVC (High Efficiency Video Coding) video compression standards on January 2013 and has actively conducted research and development for next-generation compression standards.

Video compression is largely composed of intra prediction, inter prediction, transform, quantization, entropy coding and in-loop filter. On the other hand, as a demand for a high resolution image has increased, a demand for stereoscopic image contents has increased as a new image service. A video compression technology for effectively providing high resolution and ultra high resolution stereo-scopic image contents has been discussed.

DISCLOSURE

Technical Problem

A purpose of the present disclosure is to provide an image encoding/decoding method and device that efficiency is improved.

A purpose of the present disclosure is to provide a prediction method and device per inter mode.

A purpose of the present disclosure is to provide a method and device of deriving an intra prediction mode.

A purpose of the present disclosure is to provide a method and device of configuring a reference pixel for intra prediction.

A purpose of the present disclosure is to provide an intra prediction/modification method and device.

A purpose of the present disclosure is to provide a multi type-based transform method and device.

A purpose of the present disclosure is to provide a computer readable recording medium which stores a bitstream generated by an image encoding method and device.

Technical Solution

An image encoding/decoding method and device according to the present disclosure may generate a prediction block of a current block based on a predefined prediction mode, generate a transform block of the current block through predetermined transform and reconstruct the current block based on the prediction block and the transform block.

In an image encoding/decoding method and device according to the present disclosure, generating the prediction block may include determining an intra reference line of the current block, determining an intra prediction mode of the current block from a predetermined candidate group and performing intra prediction of the current block based on the determined intra reference line and the intra prediction mode.

In an image encoding/decoding method and device according to the present disclosure, the candidate group may be classified into a first candidate group and a second candidate group, the first candidate group may be configured with a predefined default mode in a decoding device and the second candidate group may be configured with a plurality of MPM candidates.

In an image encoding/decoding method and device according to the present disclosure, an intra prediction mode of the current block may be derived by selectively using any one of the first candidate group or the second candidate group.

In an image encoding/decoding method and device according to the present disclosure, the default mode may be at least one of a planar mode, a DC mode, a vertical mode, a horizontal mode, a vertical mode or a diagonal mode.

In an image encoding/decoding method and device according to the present disclosure, the plurality of MPM candidates may include at least one of an intra prediction mode of a surrounding block (candIntraPredMode), candIntraPredMode-n, or candIntraPredMode+n.

In an image encoding/decoding method and device according to the present disclosure, the plurality of MPM candidates may include at least one of a DC mode, a vertical mode, a horizontal mode, (a vertical mode−m), (a vertical mode+m), (a horizontal mode−m) or (a horizontal mode+m).

In an image encoding/decoding method and device according to the present disclosure, the determined intra prediction mode may be changed by adding or subtracting a predetermined offset.

In an image encoding/decoding method and device according to the present disclosure, application of the offset may be selectively performed based on at least one of a size, a shape, partition information, a value of an intra prediction mode or a component type of the current block.

In an image encoding/decoding method and device according to the present disclosure, performing the intra prediction may include partitioning the current block into a plurality of sub-blocks by using a vertical line or a horizontal line and sequentially performing intra prediction in a unit of the sub-block.

In an image encoding/decoding method and device according to the present disclosure, the number of sub-blocks belonging to the current block may be variably determined based on at least one of a size or a shape of the current block.

In an image encoding/decoding method and device according to the present disclosure, performing the intra prediction may include modifying a prediction value according to the intra prediction based on a predetermined reference sample and a weight.

In an image encoding/decoding method and device according to the present disclosure, each of the reference sample and weight may be determined based on at least one of a size of the current block, a position of a current sample targeted for modification or an intra prediction mode of the current block.

In an image encoding/decoding method and device according to the present disclosure, the transform may be performed by selectively using at least one of DCT-2, DST-7 or DCT-8.

A digital storage media according to the present disclosure may store a video bitstream generated according to the above-described image encoding method/device.

Advantageous Effects

The present disclosure may provide a method and device of deriving an effective intra prediction mode.

The present disclosure may improve encoding efficiency by configuring an adaptive reference sample.

The present disclosure may improve accuracy of intra prediction through modification of intra prediction.

The present disclosure may improve encoding efficiency of a residual sample by performing additional transform as well as multi type-based transform.

According to the present disclosure, a computer readable recoding medium storing a bitstream generated by an image encoding method/device according to the present disclosure may be provided.

DESCRIPTION OF DRAWINGS

FIGS. 25 to 27 show a method in which a residual image is encoded/decoded based on transform and/or quantization as an embodiment to which the present disclosure is applied.

BEST MODE

Figure 1:
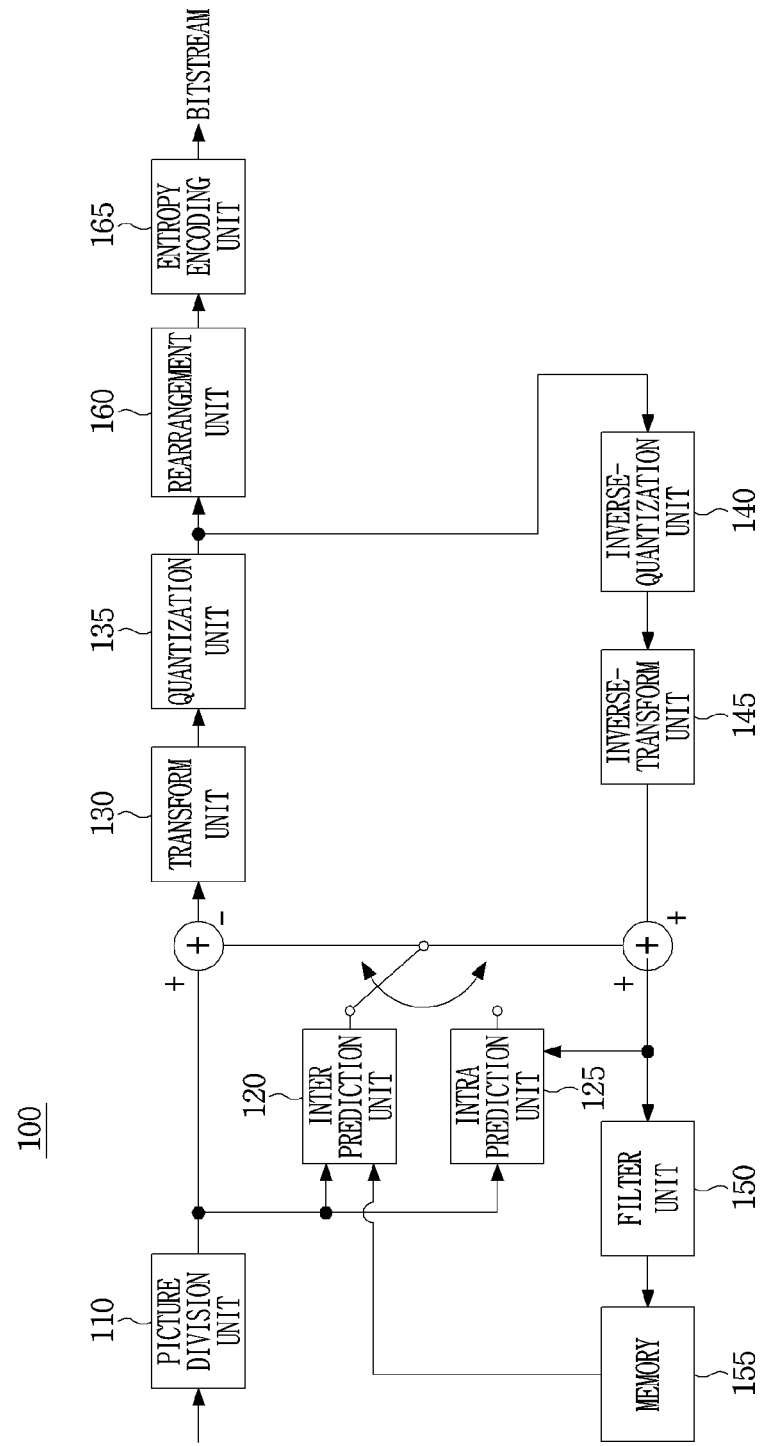
FIG. 1 is a block diagram showing an image encoding device according to the present disclosure.

An image encoding/decoding method and device according to the present disclosure may generate a prediction block of a current block based on a predefined prediction mode, generate a transform block of the current block through predetermined transform and reconstruct the current block based on the prediction block and the transform block.

In an image encoding/decoding method and device according to the present disclosure, generating the prediction block may include determining an intra reference line of the current block, determining an intra prediction mode of the current block from a predetermined candidate group and performing intra prediction of the current block based on the determined intra reference line and the intra prediction mode.

In an image encoding/decoding method and device according to the present disclosure, the candidate group may be classified into a first candidate group and a second candidate group, the first candidate group may be configured with a predefined default mode in a decoding device and the second candidate group may be configured with a plurality of MPM candidates.

In an image encoding/decoding method and device according to the present disclosure, an intra prediction mode of the current block may be derived by selectively using any one of the first candidate group or the second candidate group.

In an image encoding/decoding method and device according to the present disclosure, the default mode may be at least one of a planar mode, a DC mode, a vertical mode, a horizontal mode, a vertical mode or a diagonal mode.

In an image encoding/decoding method and device according to the present disclosure, the plurality of MPM candidates may include at least one of an intra prediction mode of a surrounding block (candIntraPredMode), candIntraPredMode-n, or candIntraPredMode+n.

In an image encoding/decoding method and device according to the present disclosure, the plurality of MPM candidates may include at least one of a DC mode, a vertical mode, a horizontal mode, (a verticle mode−m), (a vertical mode+m), (a horizontal mode−m) or (a horizontal mode+m).

In an image encoding/decoding method and device according to the present disclosure, the determined intra prediction mode may be changed by adding or subtracting a predetermined offset.

In an image encoding/decoding method and device according to the present disclosure, application of the offset may be selectively performed based on at least one of a size, a shape, partition information, a value of an intra prediction mode or a component type of the current block.

In an image encoding/decoding method and device according to the present disclosure, performing the intra prediction may include partitioning the current block into a plurality of sub-blocks by using a vertical line or a horizontal line and sequentially performing intra prediction in a unit of the sub-block.

In an image encoding/decoding method and device according to the present disclosure, the number of sub-blocks belonging to the current block may be variably determined based on at least one of a size or a shape of the current block.

In an image encoding/decoding method and device according to the present disclosure, performing the intra prediction may include modifying a prediction value according to the intra prediction based on a predetermined reference sample and a weight.

In an image encoding/decoding method and device according to the present disclosure, each of the reference sample and weight may be determined based on at least one of a size of the current block, a position of a current sample targeted for modification or an intra prediction mode of the current block.

In an image encoding/decoding method and device according to the present disclosure, the transform may be performed by selectively using at least one of DCT-2, DST-7 or DCT-8.

A digital storage media according to the present disclosure may store a video bitstream generated according to the above-described image encoding method/device.

MODE FOR INVENTION

Referring to a diagram attached in this description, an embodiment of the present disclosure is described in detail so that a person with ordinary skill in the art to which the inventions pertain may easily carry it out. But, the present disclosure may be implemented in a variety of different shapes and is not limited to an embodiment which is described herein. And, a part irrelevant to description is omitted and a similar diagram code is attached to a similar part through the description to clearly describe the present disclosure in a diagram.

In this description, when a part is referred to as being 'connected to' other part, it includes a case that it is electrically connected while intervening another element as well as a case that it is directly connected.

In addition, in this description, when a part is referred to as 'including' a component, it means that other components may be additionally included without excluding other components, unless otherwise specified.

In addition, a term such as first, second, etc. may be used to describe various components, but the components should not be limited by the terms. The terms are used only to distinguish one component from other components.

In addition, in an embodiment on a device and a method described in this description, some configurations of the device or some steps of the method may be omitted. In addition, the order of some configurations of the device or some steps of the method may be changed. In addition, another configuration or another step may be inserted in some configurations of the device or some steps of the method.

In addition, some configurations or some steps in a first embodiment of the present disclosure may be added to a second embodiment of the present disclosure or may be replaced with some configurations or some steps in a second embodiment.

In addition, as construction units shown in an embodiment of the present disclosure are independently shown to represent different characteristic functions, it does not mean that each construction unit is configured in separate hardware or one software construction unit. In other words, each construction unit may be described by being enumerated as each construction unit for convenience of description, at least two construction units among each construction unit may be combined to configure one construction unit or one construction unit may be divided into a plurality of construction units to perform a function. Such an integrated embodiment and separated embodiment in each construction unit are also included in a scope of a right on the present disclosure as long as they are not beyond the essence of the present disclosure.

In this description, a block may be variously represented as a unit, a region, a unit, a partition, etc. and a sample may be variously represented as a pixel, a pel, a pixel, etc.

Hereinafter, referring to the attached diagrams, an embodiment of the present disclosure will be described in more detail. In describing the present disclosure, overlapping description for the same component is omitted.

FIG. 1 is a block diagram showing an image encoding device according to the present disclosure.

In reference to FIG. 1, a traditional image encoding device 100 may include a picture partition unit 110, a prediction unit 120, 125, a transform unit 130, a quantization unit 135, a rearrangement unit 160, an entropy encoding unit 165, a dequantization unit 140, an inverse transform unit 145, a filter unit 150 and a memory 155.

A picture partition unit 110 may partition an input picture into at least one processing unit. In this case, a processing unit may be a prediction unit (PU), a transform unit (TU) or a coding unit (CU). Hereinafter, in an embodiment of the present disclosure, a coding unit may be used as a unit performing encoding and may be used as a unit performing decoding.

A prediction unit may be partitioned in at least one square shape or rectangular shape, etc. with the same size within one coding unit and may be partitioned so that any one prediction unit among prediction units partitioned in one coding unit will have a shape and/or size different from another prediction unit. When it is not a minimum coding unit in generating a prediction unit which performs intra prediction based on a coding unit, intra prediction may be performed without being partitioned into a plurality of prediction units, N×N A prediction unit 120 and 125 may include an inter prediction unit 120 performing inter prediction and an intra prediction unit 125 performing intra prediction. Whether to perform inter prediction or intra prediction for a prediction unit may be determined and concrete information according to each prediction method (e.g., an intra prediction mode, a motion vector, a reference picture, etc.) may be determined. A residual value (a residual block) between a generated prediction block and an original block may be input into a transform unit 130. In addition, prediction mode information, motion vector information, etc. used for prediction may be encoded in an entropy encoding unit 165 with a residual value and transmitted to a decoder.

An inter prediction unit 120 may predict a prediction unit based on information of at least one picture of a previous picture or a subsequent picture of a current picture and may predict a prediction unit based on information of some regions which are encoded in a current picture in some cases. An inter prediction unit 120 may include a reference picture interpolation unit, a motion prediction unit and a motion compensation unit.

In a reference picture interpolation unit, reference picture information may be provided from a memory 155 and pixel information equal to or less than an integer pixel may be generated in a reference picture. For a luma pixel, a DCT-based 8-tap interpolation filter with a different filter coefficient may be used to generate pixel information equal to or less than an integer pixel in a ¼ pixel unit. For a chroma signal, a DCT-based 4-tap interpolation filter with a different filter coefficient may be used to generate pixel information equal to or less than an integer pixel in a ⅛ pixel unit.

A motion prediction unit may perform motion prediction based on a reference picture interpolated by a reference picture interpolation unit. As a method for calculating a motion vector, various methods such as FBMA (Full search-based Block Matching Algorithm), TSS (Three Step Search), NTS(New Three-Step Search Algorithm), etc. may be used. A motion vector may have a motion vector value in a ½ or ¼ pixel unit based on an interpolated pixel. In a motion prediction unit, a current prediction unit may be predicted by making a motion prediction method different. For a motion prediction method, various methods such as a skip mode, a merge mode, a AMVP (Advanced Motion Vector Prediction) mode, an intra block copy mode, an affine mode, etc. may be used.

An intra prediction unit 125 may generate a prediction unit based on reference pixel information around a current block, pixel information in a current picture. When a reference pixel is a pixel which performed inter prediction because a surrounding block in a current prediction unit is a block which performed inter prediction, a reference pixel included in a block which performed inter prediction may be used by being substituted with reference pixel information of a block which performed surrounding intra prediction. In other words, when a reference pixel is unavailable, unavailable reference pixel information may be used by being substituted with at least one reference pixel of available reference pixels.

In addition, a residual block including residual value information, a difference value between a prediction unit which performed prediction based on a prediction unit generated in a prediction unit 120 and 125 and an original block in a prediction unit, may be generated. A generated residual block may be input into a transform unit 130.

In a transform unit 130, an original block and a residual block including residual value information in a prediction unit generated in a prediction unit 120 and 125 may be transformed by using a transform method such as DCT (Discrete Cosine Transform), DST (Discrete Sine Transform), KLT. Whether to apply DCT, DST or KLT to transform a residual block may be determined based on intra prediction mode information in a prediction unit used to generate a residual block.

A quantization unit 135 may quantize values which are transformed into a frequency domain in a transform unit 130. According to a block or according to image importance, a quantized coefficient may be changed. A value calculated in a quantization unit 135 may be provided to a dequantization unit 140 and a rearrangement unit 160.

A rearrangement unit 160 may perform rearrangement of a coefficient value for a quantized residual value.

A rearrangement unit 160 may change a two-dimensional block-shaped coefficient into a one-dimensional vector shape through a coefficient scanning method. For example, in a rearrangement unit 160, a DC coefficient to a coefficient in a high frequency domain may be scanned by a zig-zag scanning method and may be changed into a one-dimensional vector shape. A vertical scan which scans a two-dimensional block-shaped coefficient by column or a horizontal scan which scans a two-dimensional block-shaped coefficient by row may be used instead of a zig-zag scan according to a size of a transform unit and an intra prediction mode. In other words, whether which scanning method among a zig-zag scan, a vertical directional scan and a horizontal directional scan will be used may be determined according to a size of a transform unit and an intra prediction mode.

An entropy encoding unit 165 may perform entropy encoding based on values calculated by a rearrangement unit 160. For example, entropy encoding may use various encoding methods such as Exponential Golomb, CAVLC (Context-Adaptive Variable Length Coding), CABAC (Context-Adaptive Binary Arithmetic Coding). Regarding it, an entropy encoding unit 165 may encode residual value coefficient information in a coding unit from a rearrangement unit 160 and a prediction unit 120, 125. In addition, according to the present disclosure, it is possible to signal and transmit information indicating that motion information is derived in terms of a decoder and used and information on a method used for deriving motion information.

In a dequantization unit 140 and an inverse transform unit 145, values quantized in a quantization unit 135 are dequantized and values transformed in a transform unit 130 are inversely transformed. A residual value generated in a dequantization unit 140 and an inverse transform unit 145 may generate a reconstructed block by being combined with a prediction unit which is predicted through a motion prediction unit, a motion compensation unit and an intra prediction unit included in a prediction unit 120 and 125.

A filter unit 150 may include at least one of a deblocking filter, an offset modification unit and ALF (Adaptive Loop Filter). A deblocking filter may remove block distortion generated by a boundary between blocks in a reconstructed picture. An offset modification unit may modify an offset with an original image in a pixel unit for an image performing deblocking. A method in which a pixel included in an image is divided into the certain number of regions, a region which will perform an offset is determined and an offset is applied to the corresponding region or a method in which an offset is applied by considering edge information of each pixel may be used to perform offset modification for a specific picture. ALF (Adaptive Loop Filter) may be performed based on a value comparing a filtered reconstructed image with an original image. A pixel included in an image may be divided into a predetermined group, one filter which will be applied to the corresponding group may be determined and a filtering may be performed discriminately per group A memory 155 may store a reconstructed block or picture calculated in a filter unit 150 and a stored reconstructed block or picture may be provided for a prediction unit 120 and 125 when inter prediction is performed.

Figure 2:
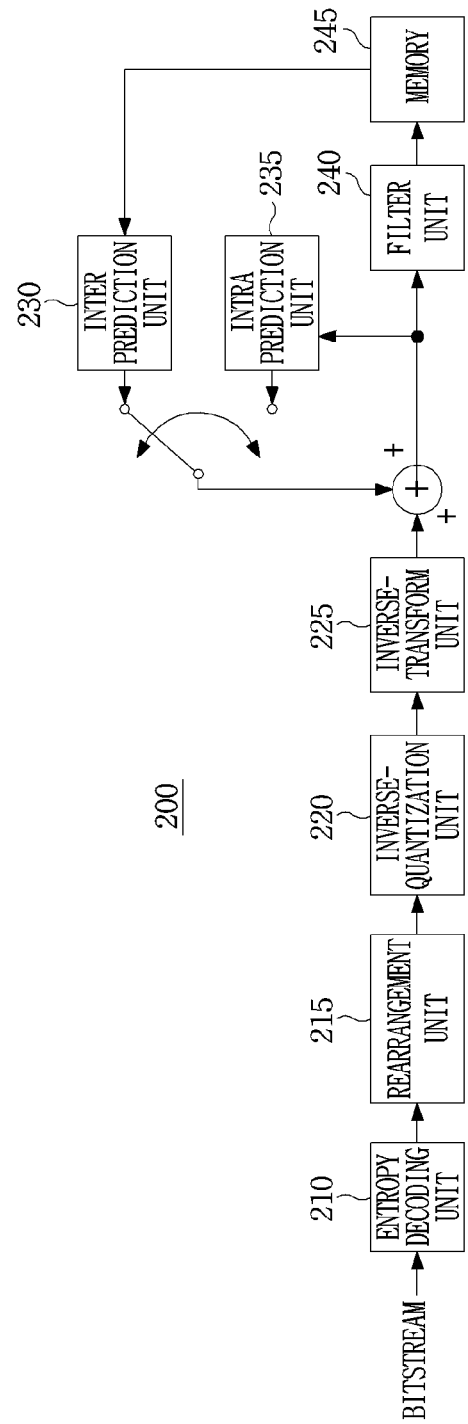
FIG. 2 is a block diagram showing an image decoding device according to the present disclosure.

FIG. 2 is a block diagram showing an image decoding device according to the present disclosure.

In reference to FIG. 2, an image decoder 200 may include an entropy decoding unit 210, a rearrangement unit 215, a dequantization unit 220, an inverse transform unit 225, a prediction unit 230 and 235, a filter unit 240 and a memory 245.

When an image bitstream is input in an image encoder, an input bitstream may be decoded in a process opposite to that of an image encoder.

An entropy decoding unit 210 may perform entropy decoding in a process opposite to a process in which entropy encoding is performed in an entropy encoding unit of an image encoder. For example, in response to a method performed in an image encoder, various methods such as Exponential Golomb, CAVLC (Context-Adaptive Variable Length Coding) and CABAC (Context-Adaptive Binary Arithmetic Coding) may be applied.

In an entropy decoding unit 210, information related to intra prediction and inter prediction performed in an encoder may be decoded.

A rearrangement unit 215 may perform rearrangement for a bitstream entropy-decoded in an entropy decoding unit 210 based on a rearrangement method of an encoding unit. Coefficients represented in a one-dimensional vector shape may be reconstructed into coefficients in a two-dimensional block shape and may be rearranged.

A dequantization unit 220 may perform dequantization based on a quantization parameter provided in an encoder and a coefficient value of a rearranged block.

An inverse transform unit 225 may perform inverse DCT, inverse DST and inverse KLT, i.e., inverse transform for DCT, DST and KLT, i.e., transform performed in a transform unit for a result of quantization performed in an image encoder. Inverse transform may be performed based on a transmission unit determined in an image encoder. In the inverse transform unit 225 of an image decoder, a transform method (e.g., DCT, DST, KLT) may be selectively performed according to a plurality of information such as a prediction method, a size of a current block, a prediction direction, etc.

A prediction unit 230 and 235 may generate a prediction block based on information related to prediction block generation provided in an entropy decoding unit 210 and pre-decoded block or picture information provided in a memory 245.

As described above, when a size of a prediction unit is the same as that of a transform unit in performing intra prediction in the same manner as operation in an image encoder, intra prediction for a prediction unit may be performed based on a pixel at a left position of a prediction unit, a pixel at a top-left position and a pixel at a top position, but when a size of a prediction unit is different from that of a transform unit in performing intra prediction, intra prediction may be performed by using a reference pixel based on a transform unit. In addition, intra prediction using N×N partitions only for a minimum coding unit may be used.

A prediction unit 230 and 235 may include a prediction unit determination unit, an inter prediction unit and an intra prediction unit. A prediction unit determination unit may receive a variety of information such as prediction unit information, prediction mode information of an intra prediction method, information related to motion prediction of an inter prediction method, etc. which are input from an entropy decoding unit 210, classify a prediction unit in a current coding unit and determine whether a prediction unit performs inter prediction or intra prediction. On the other hand, if information indicating that motion information is derived in terms of a decoder and used and information on a method used for deriving motion information are transmitted in an encoding device 100 without transmitting motion prediction-related information for the inter prediction, the prediction unit determination unit determines whether an inter prediction unit 230 performs prediction based on information transmitted from an encoding device 100.

An inter prediction unit 230 may perform inter prediction on a current prediction unit based on information included in at least one picture of a previous picture or a subsequent picture of a current picture including a current prediction unit by using information necessary for inter prediction of a current prediction unit provided by an image encoder. To perform inter prediction, whether a motion prediction method in a prediction unit included in a corresponding coding unit based on a coding unit is a skip mode, a merge mode, a AMVP mode, an intra block copy mode, or an affine mode may be determined.

An intra prediction unit 235 may generate a prediction block based on pixel information in a current picture. When a prediction unit is a prediction unit which performs intra prediction, intra prediction may be performed based on intra prediction mode information in a prediction unit provided by an image encoder.

An intra prediction unit 235 may include an adaptive intra smoothing (AIS) filter, a reference pixel interpolation unit and a DC filter. As a part performing filtering for a reference pixel of a current block, an AIS filter may be applied by determining whether a filter is applied according to a prediction mode in a current prediction unit. AIS filtering may be performed for a reference pixel of a current block by using a prediction mode in a prediction unit and AIS filter information provided by an image encoder. When a prediction mode of a current block is a mode where AIS filtering is not performed, an AIS filter may not be applied.

When a prediction mode in a prediction unit is a prediction unit in which intra prediction is performed based on a pixel value interpolating a reference pixel, a reference pixel interpolation unit may interpolate a reference pixel to generate a reference pixel in a pixel unit which is equal to or smaller than an integer value. When a prediction mode in a current prediction unit is a prediction mode which generates a prediction block without interpolating a reference pixel, a reference pixel may not be interpolated. A DC filter may generate a prediction block through filtering when a prediction mode of a current block is a DC mode.

A reconstructed block or picture may be provided to a filter unit 240. A filter unit 240 may include a deblocking filter, an offset modification unit and an ALF.

Information on whether a deblocking filter is applied to a corresponding block or picture and information on whether a strong filter or a weak filter is applied when a deblocking filter is applied may be provided by an image encoder. A deblocking filter of an image decoder may receive information related to a deblocking filter provided by an image encoder and perform deblocking filtering for a corresponding block in an image decoder.

An offset modification unit may perform offset modification on a reconstructed image based on a type of offset modification, offset value information, etc. applied to an image in encoding. An ALF may be applied to a coding unit based on information on whether an ALF is applied, ALF coefficient information, etc. provided by an encoder. Such ALF information may be provided by being included in a specific parameter set.

A memory 245 may store a reconstructed picture or block for use as a reference picture or a reference block and also provide a reconstructed picture to an output unit.

Figure 3:
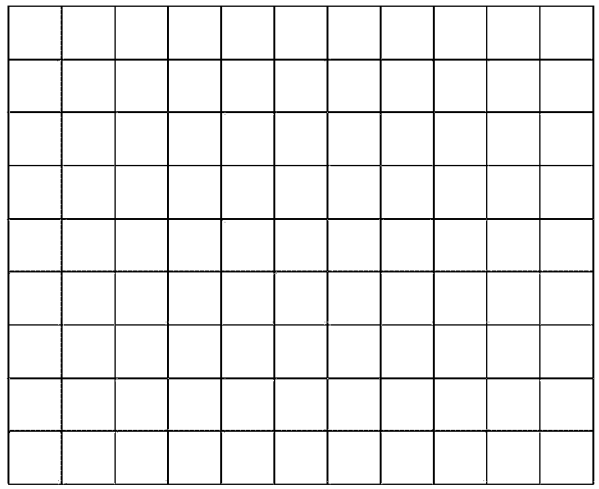
FIGS. 3 to 5 show a method in which a picture is partitioned into a plurality of blocks as an embodiment to which the present disclosure is applied.
Figure 4:
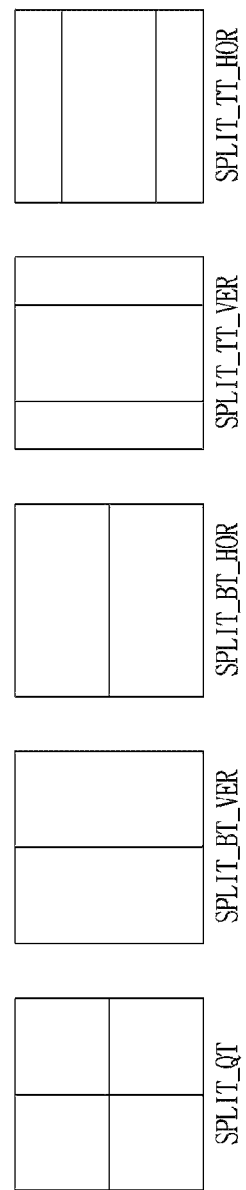
Figure 5:
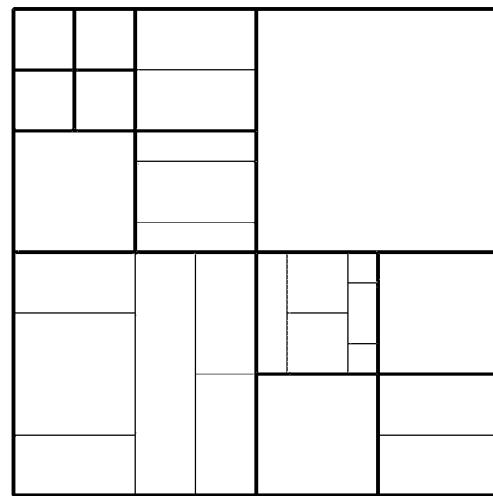

FIGS. 3 to 5 show a method in which a picture is partitioned into a plurality of blocks as an embodiment to which the present disclosure is applied.

In reference to FIG. 3, a picture is partitioned into a plurality of base coding units (Coding Tree Unit, hereinafter, CTU).

A size of CTU may be regulated in a unit of a picture or a video sequence unit and each CTU is configured not to be overlapped with other CTU. For example, a CTU size may be set as 128×128 in the whole sequences and any one of 128×128 to 256×256 may be selected in a unit of a picture and used.

A coding block/a coding unit (hereinafter, CU) may be generated by hierarchically partitioning CTU. Prediction and transform may be performed in a unit of a coding unit and it becomes a base unit which determines a prediction encoding mode. A prediction encoding mode may represent a method of generating a prediction image and consider intra prediction, inter prediction or combined prediction, etc. as an example. Concretely, for example, a prediction block may be generated by using a prediction encoding mode of at least any one of intra prediction, inter prediction or combined prediction in a unit of a coding unit. When a reference picture indicates a current picture in an inter prediction mode, a prediction block may be generated based on a region in a current picture which has been already encoded. It may be included in inter prediction because a prediction block is generated by using a reference picture index and a motion vector. Intra prediction is a method in which a prediction block is generated by using information of a current picture, inter prediction is a method in which a prediction block is generated by using information of other picture which has been already decoded and combined prediction is a method in which inter prediction and intra prediction are combined and used. Combined prediction may encode/decode some regions of a plurality of sub-regions configuring one coding block with inter prediction and may encode/decode other regions with intra prediction. Alternatively, combined prediction may primarily perform inter prediction for a plurality of sub-regions and secondarily perform intra prediction. In this case, a prediction value of a coding block may be derived by performing a weighted average for a prediction value according to inter prediction and a prediction value according to intra prediction. The number of sub-regions configuring one coding block may be 2, 3, 4, or more and a shape of a sub-region may be a quadrangle, a triangle or other polygon.

In reference to FIG. 4, CTU may be partitioned in a shape of quad tree, binary tree or triple tree. A partitioned block may be additionally partitioned in a shape of quad tree, binary tree or triple tree. A method in which a current block is partitioned into 4 square partitions is referred to as quad tree partitioning, a method in which a current block is partitioned into 2 square or non-square partitions is referred to as binary tree partitioning and a method in which a current block is partitioned into 3 partitions is defined as binary tree partitioning.

Binary partitioning in a vertical direction (SPLIT_BT_VER in FIG. 4) is referred to as vertical binary tree partitioning and binary tree partitioning in a horizontal direction (SPLIT_BT_HOR in FIG. 4) is defined as horizontal binary tree partitioning.

Triple partitioning in a vertical direction (SPLIT_TT_VER in FIG. 4) is referred to as vertical triple tree partitioning and triple tree partitioning in a horizontal direction (SPLIT_TT_HOR in FIG. 4) is defined as horizontal triple tree partitioning.

The number of partitions may be referred to as a partitioning depth and the maximum value of a partitioning depth may be differently set per sequence, picture, sub-picture, slice or tile and it may be set to have a different partitioning depth according to a partitioning tree shape (quad tree/binary tree/triple tree) and a syntax representing it may be signaled.

As a method such as quad tree partitioning, binary tree partitioning or triple tree partitioning, a coding unit of a leaf node may be configured by additionally partitioning a partitioned coding unit or without additional partitioning.

In reference to FIG. 5, a coding unit may be set by hierarchically partitioning one CTU and a coding unit may be partitioned by using at least any one of binary tree partitioning, quad tree partitioning/triple tree partitioning. Such a method is defined as multi tree partitioning.

A coding unit generated by partitioning an arbitrary coding unit whose partitioning depth is k is referred to as a lower coding unit and a partitioning depth is (k+1). A coding unit with a partitioning depth of k which includes a lower coding unit whose partitioning depth is (k+1) is referred to as a higher coding unit.

A partitioning type of a current coding unit may be limited according to a partitioning type of a higher coding unit and/or a partitioning type of a coding unit around a current coding unit.

In this case, a partitioning type represents an indicator which indicates which partitioning of binary tree partitioniong, quad tree partitioning/triple tree partitioning is used.

Figure 6:
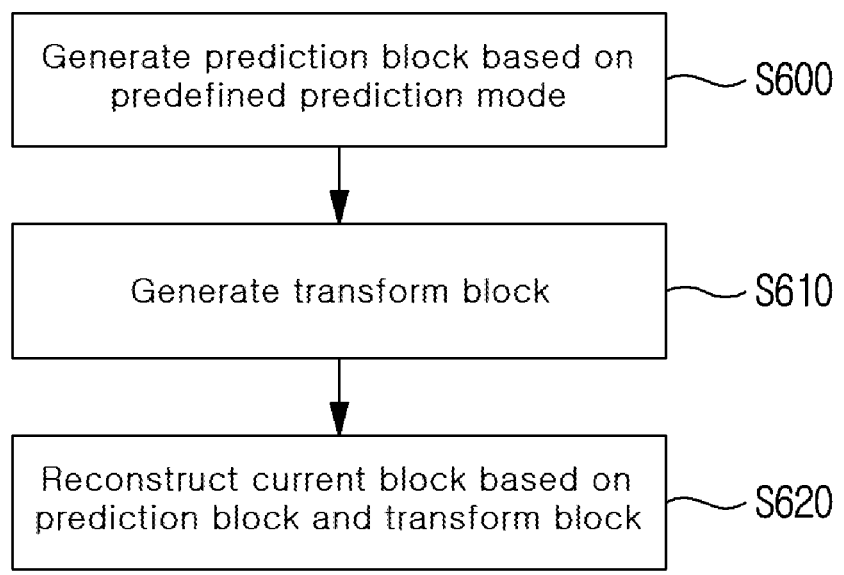
FIG. 6 roughly shows a process in which a current block is reconstructed as an embodiment to which the present disclosure is applied.

FIG. 6 roughly shows a process in which a current block is reconstructed as an embodiment to which the present disclosure is applied.

In reference to FIG. 6, a prediction block of a current block may be generated based on a predefined prediction mode in an encoding/decoding device S600.

A prediction image may be generated by a plurality of methods in encoding/decoding a video and a method of generating a prediction image is referred to as a prediction encoding mode.

A prediction encoding mode may be configured with an intra prediction encoding mode, an inter prediction encoding mode, a current picture reference encoding mode or a combined encoding mode (combined prediction), etc.

An inter prediction encoding mode is referred to as a prediction encoding mode which generates a prediction block (a prediction image) of a current block by using information of a previous picture and an intra prediction encoding mode is referred to as a prediction encoding mode which generates a prediction block by using a sample neighboring a current block. A prediction block may be generated by using a pre-reconstructed image of a current picture, which is defined as a current picture reference mode or an intra block copy mode.

A prediction block may be generated by using at least 2 or more prediction encoding modes of an inter prediction encoding mode, an intra prediction encoding mode or a current picture reference encoding mode, which is defined as a combined encoding mode (combined prediction). An inter prediction encoding mode will be described in detail by referring to FIGS. 7 to 12. An intra prediction encoding mode will be described in detail by referring to FIGS. 13 to 24.

In reference to FIG. 6, a transform block of a current block may be generated through predetermined transform S610.

A transform block may be generated based on at least one of n transform types which are predefined in an encoding/decoding device. n may be an integer such as 1, 2, 3, 4, or more. DCT2, DCT8, DST7, a transform skip mode, etc. may be used for the transform type. Only one same transform type may be applied in a vertical/horizontal direction of one block or a different transform type may be applied in a vertical/horizontal direction, respectively. For it, a flag representing whether one same transform type is applied may be used. The flag may be signaled in an encoding device.

In addition, the transform type may be determined based on information signaled in an encoding device or may be determined based on a predetermined encoding parameter. In this case, an encoding parameter may mean at least one of a size or a shape of a block, an intra prediction mode or a component type (e.g., luma, chroma). A size of a block may be represented as a width, a height, a ratio of a width and a height, a multiplication of a width and a height, a sum/a difference of a width and a height, etc. For example, when a size of a current block is greater than a predetermined threshold value, a transform type in a horizontal direction may be determined as a first transform type (e.g., DCT2) and a transform type in a vertical direction may be determined as a second transform type (e.g., DST7). The threshold value may be an integer such as 0, 4, 8, 16, 32, or more. A method of determining a transform type will be described by referring to FIG. 25.

On the other hand, a residual coefficient according to the present disclosure may be obtained by performing second transform after first transform. Second transform may be performed for a residual coefficient of some regions in a current block. In this case, a decoding device may obtain a transform block of a current block by performing second inverse transform for the some regions and performing first inverse transform for a current block including the inversely-transformed some regions. It will be described by referring to FIGS. 26 to 27.

In reference to FIG. 6, a current block may be reconstructed based on a prediction block and a transform block S620.

A predetermined in-loop filter may be applied to a reconstructed current block. An in-loop filter may include at least one of a deblocking filter, a SAO (sample adaptive offset) filter or an ALF (adaptive loop filter), which will be described by referring to FIGS. 28 to 29.

Figure 7:
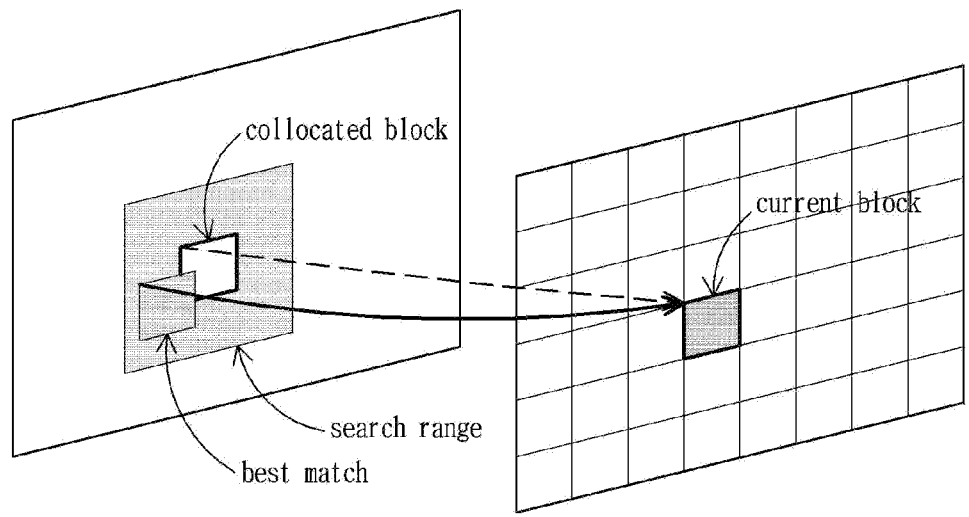
FIG. 7 shows an inter prediction method as an embodiment to which the present disclosure is applied.

FIG. 7 shows an inter prediction method as an embodiment to which the present disclosure is applied.

A method in which a prediction block (a prediction image) of a block in a current picture is generated by using information of a previous picture is defined as an inter prediction encoding mode.

For example, a prediction image may be generated based on a colocated block/co-located block of a previous picture or a prediction block (a prediction image) may be generated based on a specific block of a previous picture.

In this case, a specific block may be derived from a motion vector. A colocated block represents a block of the corresponding picture that a position and a size of a top-left sample are the same as a current block as in FIG. 7. The corresponding picture may be specified by the same syntax as a reference picture reference.

A prediction block may be generated by considering a motion of an object in an inter prediction encoding mode.

For example, if knowing in which direction and how much an object in a previous picture moves, a prediction block (a prediction image) may be generated based on a block considering a motion in a current block, which is defined as a motion prediction block.

A residual block may be generated by subtracting a motion prediction block or the corresponding prediction block from a current block.

When a motion is generated in an object, energy of a residual block decreases if a motion prediction block rather than the corresponding prediction block is used, so compression performance may be improved.

As such, a method of using a motion prediction block is referred to as motion compensation prediction and motion compensation prediction is used for most inter prediction encoding.

A value representing in which direction and how much an object in a previous picture moves is referred to as a motion vector. A motion vector may use a motion vector with different pixel precision in a unit of a sequence, a picture, a sub-picture, a slice, a tile, a brick, CTU or CU. For example, pixel precision of a motion vector in a specific block may be at least any one of 1/16, 1/8, 1/4, 1/2, 1, 2, 4 or 8. A type and/or number of available pixel precision candidates may be different per inter prediction encoding mode which is described after. For example, for an affine inter prediction method, k pixel precision is available and for an inter prediction method using a translation motion, i pixel precision is unavailable. For a current picture reference mode, j pixel precision is available. In this case, k, i and j may be a natural number such as 1, 2, 3, 4, 5, or more. But, k may be smaller than i and i may be smaller than j. An affine inter prediction method may use at least one pixel precision of 1/16, 1/4 or 1 and an inter prediction method using a translation motion (e.g., a merge mode, an AMVP mode) may use at least one pixel precision of 1/4, 1/2, 1 or 4. A current picture reference mode may use at least one pixel precision of 1, 4, or 8.

For an inter prediction mode, an inter prediction method using a translation motion and an affine inter prediction method using an affine motion may be selectively used. Hereinafter, it will be described by referring to FIGS. 8 to 12.

Figure 8:
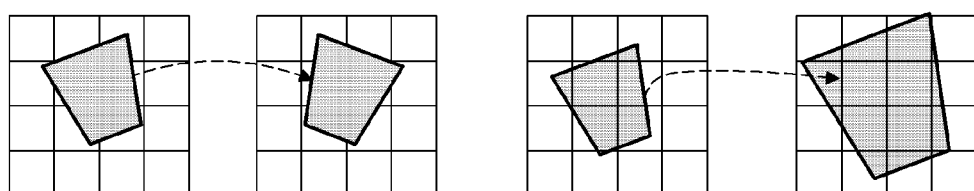
FIGS. 8 to 10 show an affine inter prediction method as an embodiment to which the present disclosure is applied.
Figure 8:
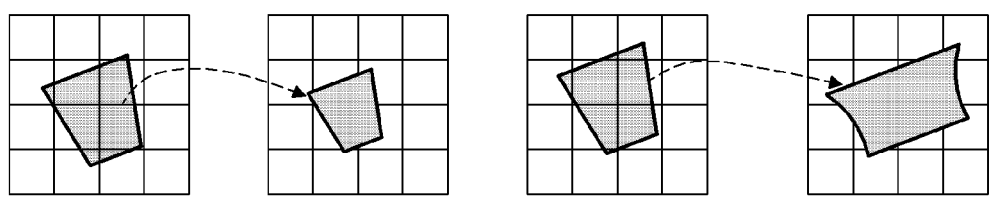
Figure 9:
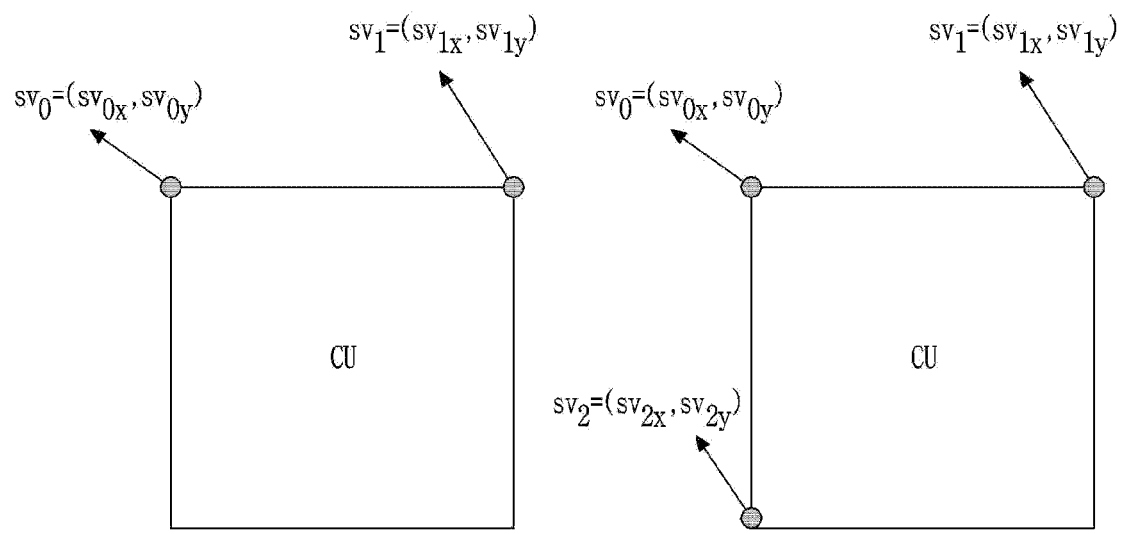
Figure 10:
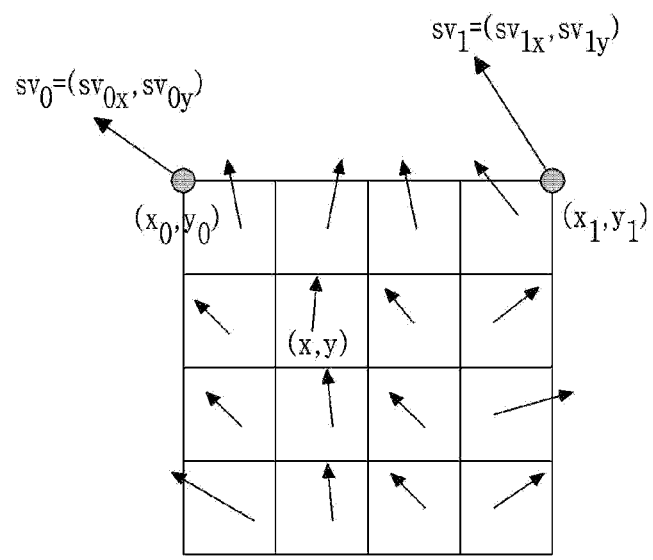

FIGS. 8 to 10 show an affine inter prediction method as an embodiment to which the present disclosure is applied.

In a video, a lot of cases occur in which a motion of a specific object does not appear linearly. For example, as in FIG. 8, when only a translation motion vector is used for a motion of an object in an image that an affine motion such as zoom-in, zoom-out, rotation, affine transform which makes transform in an arbitrary shape possible, etc. is used, a motion of an object may not be effectively represented and encoding performance may be reduced.

An affine motion may be represented as in the following Equation 1.

$$v_x = ax - by + e$$

$$v_y = cx + dy + f \qquad \text{[Equation 1]}$$

When an affine motion is represented by using a total of 6 parameters, it is effective for an image with a complex motion, but lots of bits are used to encode an affine motion parameter, so encoding efficiency may be reduced.

Therefore, an affine motion may be simplified and represented with 4 parameters, which is defined as a 4-parameter affine motion model. Equation 2 represents an affine motion with 4 parameters.

$$v_x = ax - by + e$$

$$v_y = bx + ay + f \qquad \text{[Equation 2]}$$

A 4-parameter affine motion model may include a motion vector at 2 control points of a current block. A control point may include at least one of a top-left corner, a top-right corner or a bottom-left corner of a current block. In an example, a 4-parameter affine motion model may be determined by a motion vector sv0 at a top-left sample (x0, y0) of a coding unit and a motion vector sv1 at a top-right sample (x1, y1) of a coding unit as in the left of FIG. 9 and sv0 and sv1 are defined as an affine seed vector. Hereinafter, it is assumed that an affine seed vector sv0 at a top-left position is a first affine seed vector and an affine seed vector sv1 at a top-right position is a second affine seed vector. It is also possible to replace one of a first and second seed vector with an affine seed vector at a bottom-left position and use it in a 4-parameter affine motion model.

A 6-parameter affine motion model is an affine motion model that a motion vector sv2 at a residual control point (e.g., a sample at a bottom-left position (x2, y2)) is added to a 4-parameter affine motion model as in the right of FIG. 9. Hereinafter, it is assumed that an affine seed vector sv0 at a top-left position is the a affine seed vector, an affine seed vector sv1 at a top-right position is a second affine seed vector and an affine seed vector sv2 at a bottom-left position is a third affine seed vector.

Information on the number of parameters for representing an affine motion may be encoded in a bitstream. For example, a flag representing whether a 6-parameter is used and a flag representing whether a 4-parameter is used may be encoded in a unit of at least one of a picture, a sub-picture, a slice, a tile, a brick, a coding unit or CTU. Accordingly, any one of a 4-parameter affine motion model or a 6-parameter affine motion model may be selectively used in a predetermined unit.

A motion vector may be derived per sub-block of a coding unit by using an affine seed vector as in FIG. 10, which is defined as an affine sub-block vector.

An affine sub-block vector may be derived as in the following Equation 3. In this case, a base sample position of a sub-block (x, y) may be a sample positioned at a corner of a block (e.g., a top-left sample) or may be a sample that at least one of a x-axis or a y-axis is at the center (e.g., a central sample).

$$v_x = \frac{(sv_{1x} - sv_{0x})}{(x_1 - x_0)}(x - x_0) - \frac{(sv_{1y} - sv_{0y})}{(x_1 - x_0)}(y - y_0) + sv_{0x}$$
$$v_y = \frac{(sv_{1y} - sv_{0y})}{(x_1 - x_0)}(x - x_0) - \frac{(sv_{1x} - sv_{0x})}{(x_1 - x_0)}(y - y_0) + sv_{0y}$$
[Equation 3]

Motion compensation may be performed in a unit of a coding unit or in a unit of a sub-block in a coding unit by using an affine sub-block vector, which is defined as an affine inter prediction mode. In Equation 3, $(x_1 - x_0)$ may have the same value as a width of a coding unit.

Figure 11:
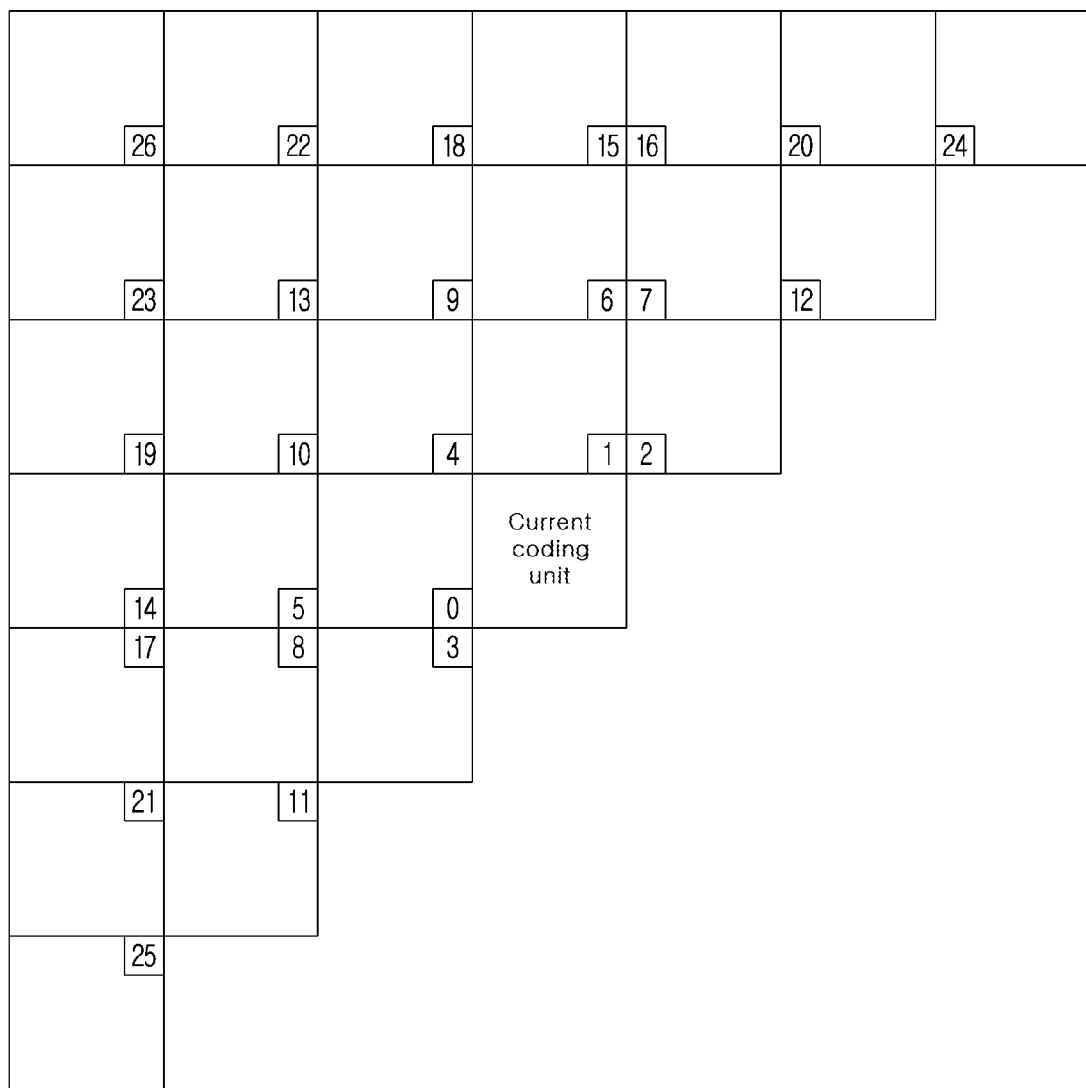
FIGS. 11 to 12 show an inter prediction method based on a merge mode as an embodiment to which the present disclosure is applied.
Figure 12:
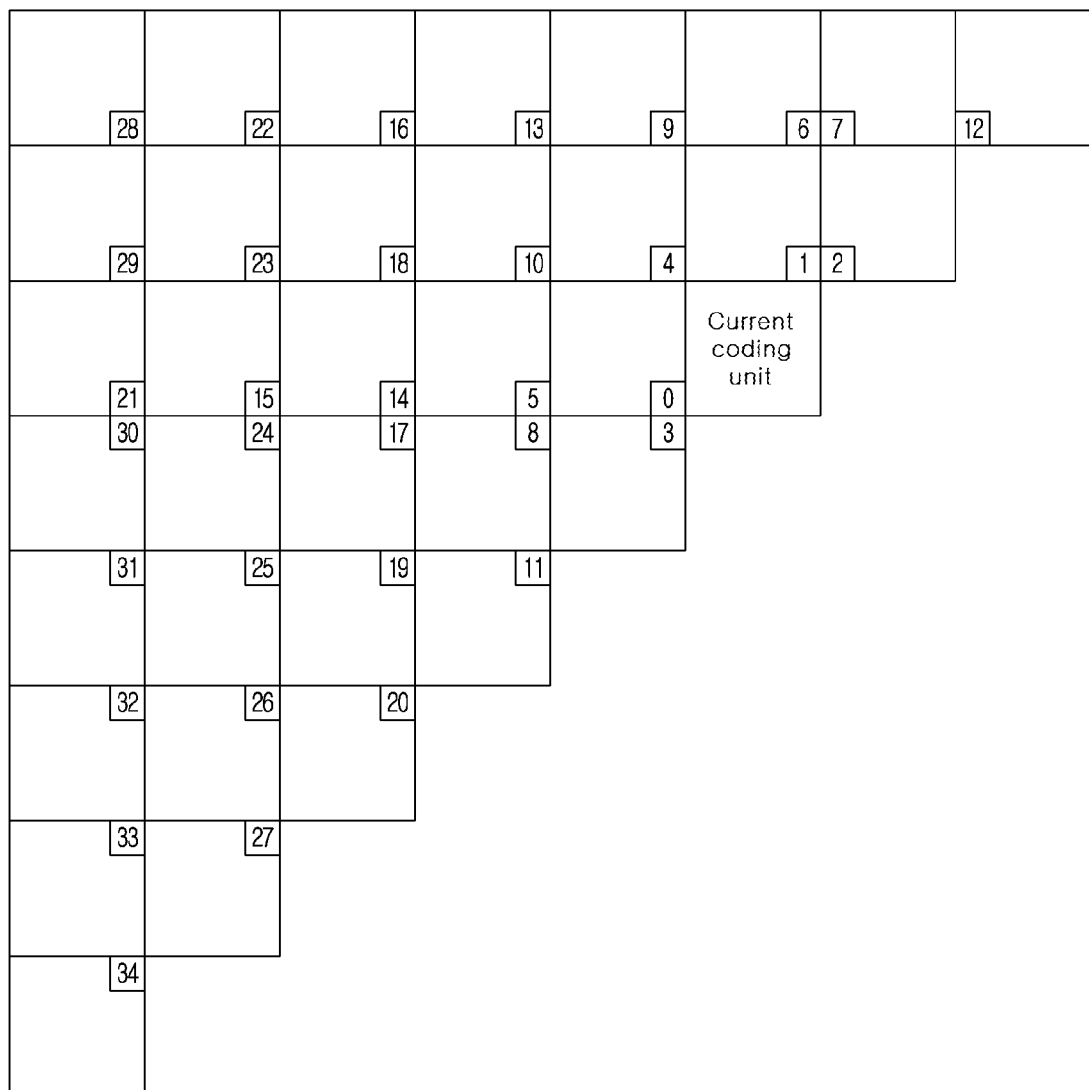

FIGS. 11 to 12 show an inter prediction method based on a merge mode as an embodiment to which the present disclosure is applied. Motion information of a current coding unit (a motion vector, a reference picture index, etc.) may be derived from motion information of a surrounding block without being encoded. Motion information of any one of surrounding blocks may be set as motion information of a current coding unit, which is defined as a merge mode.

A surrounding block used for a merge mode may be a block adjacent to a current coding unit like a merge candidate index 0 to 4 of FIG. 11 (a block bordering a boundary of a current coding unit) or may be a non-adjacent block like a merge candidate index 5 to 26 of FIG. 11. Alternatively, it may be a non-adjacent block like a merge candidate index 5 to 34 of FIG. 12.

When a distance between a merge candidate and a current block is greater than a predefined threshold value, it may be set to be unavailable.

For example, a predefined threshold value may be set as a height of CTU (ctu_height) or ctu_height+N, which is defined as a merge candidate available threshold value. In other words, when $(y_i - y_0)$, i.e., a difference between a y-axis coordinate $(y_i)$ of a merge candidate and a y-axis coordinate $(y_0)$ of a top-left sample of a current coding unit (hereinafter, a current coding unit base sample), is greater than a merge candidate available threshold value, a merge candidate may be set to be unavailable. In this case, N is a predefined offset value. Concretely, for example, N may be set to be 16 or may be set to be ctu_height.

Figure 13:
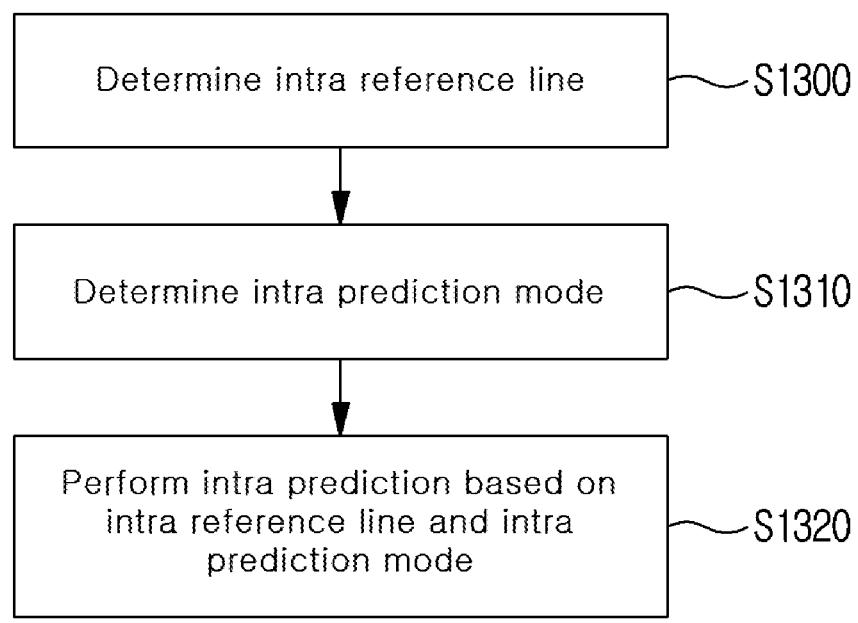
FIG. 13 shows an intra prediction process as an embodiment to which the present disclosure is applied.

FIG. 13 shows an intra prediction process as an embodiment to which the present disclosure is applied.

In reference to FIG. 13, an intra reference line of a current block may be determined S1300.

An intra reference line may mean a surrounding region referenced for intra prediction of a current block. The surrounding region may include at least one of a pixel line adjacent to a current block or a pixel line not adjacent to a current block. Any one of a plurality of pixel lines positioned around a current block may be selected and used as an intra reference line. It will be described by referring to FIG. 14.

In reference to FIG. 13, an intra prediction mode of a current block may be determined S1310.

An intra prediction mode of a current block may be determined as any one of p intra prediction modes which are predefined in an encoding/decoding device. p may be 33, 67, or more. The predefined intra prediction modes may be classified into a candidate group and a non-candidate group. An encoding/decoding device may select any one of a candidate group and a non-candidate group and may derive an intra prediction mode of a current block from a selected group. The selection may be performed based on a flag representing whether an intra prediction mode of a current block is derived from a candidate group (hereinafter, a first flag). For example, when a first flag is a first value, a candidate group may be used and otherwise, a non-candidate group may be used.

Concretely, when a first flag is a first value, an intra prediction mode of a current block may be determined based on an MPM index and a candidate group (candModeList) including at least one MPM candidate. A MPM index may be information specifying any one of MPM candidates belonging to a candidate group. A MPM index may be signaled only when a plurality of MPM candidates belong to a candidate group.

On the other hand, when a first flag is a second value (i.e., when the same MPM candidate as an intra prediction mode of a current block does not exist in a candidate group), an intra prediction mode of a current block may be determined based on remaining mode information to be signaled. The remaining mode information may specify any one of remaining modes excluding a MPM candidate in an encoding/decoding device.

Hereinafter, a method of determining a candidate group will be described.

An intra prediction mode of a surrounding coding unit may be used to improve intra prediction mode encoding efficiency of a current coding unit.

An intra prediction mode of a surrounding block is highly likely to be the same as or similar to that of a current block. An intra prediction mode of a current coding unit may be encoded by using a MPM (Most probable mode) mode which encodes whether it is the same as any one of intra prediction modes of surrounding blocks. In a MPM mode, compression efficiency may be improved by encoding a MPM index without directly encoding an intra prediction mode. A surrounding block may include at least one of a left surrounding block of a current block (a surrounding block A) or a top surrounding block (a surrounding block B).

When an intra prediction mode of a current coding unit is not any one of MPM modes, an intra prediction mode value of a current coding unit may be encoded.

A candidate group may be configured with N predefined MPM candidates. N may be an integer such as 1, 2, 3, 4, 5, 6, or more. Hereinafter, a method of configuring 6 MPM candidates will be described.

[CASE 1] A candidate group may be configured with at least one of an intra prediction mode of a surrounding block A (candIntraPredModeA), a non-directional intra prediction mode which does not have the same value as candIntraPredModeA (a DC mode or a PLANAR mode), a vertical mode (INTRA_ANGULAR50), a horizontal mode (INTRA_ANGULAR18) or a diagonal mode (at least one of INTRA_ANGULAR2, INTRA_ANGULAR34 or INTRA_ANGULAR66).

Concretely, for example, candModeList[0] may be set as candIntraPredModeA, candModeList[1] may be set as an INTRA_DC value when candIntraPredModeA is INTRA_PLANAR and may be set as an INTRA_PLANAR value when candIntraPredModeA is not INTRA_PLANAR, and candModeList[2] may be set as INTRA_ANGULAR50, candModeList[3] may be set as INTRA_ANGULAR18, candModeList[4] may be set as INTRA_ANGULAR34 and candModeList[5] may be set as INTRA_ANGULAR2.

[CASE 2] When candIntraPredA is the same as an intra prediction mode of a surrounding block B (candIntraPredB) and candIntraPredA and candIntraPredB are greater than or equal to 2, the candidate group may include at least one of candIntraPredA, INTRA_PLANAR, INTRA_DC, candIntraPredA-1, candIntraPredA+1 or a mode vertical to candIntraPredA.

Concretely, for example, candModeList[0] may be set as candIntraPredModeA, candModeList[1] may be set as INTRA_PLANAR, candModeList[2] may be set as INTRA_DC, candModeList[3] may be set as candIntraPredModeA-1 (i.e., 2+((candIntraPredModeA+62) % 65)), candModeList[4] may be set as candIntraPredModeA+1 (i.e., 2+((candIntraPredModeA-1) % 65)), and candModeList[5] may be set as a mode vertical to candIntraPredA (i.e., candModeList[5]=2+((candIntraPredModeA+94) % 65)).

[CASE 3] When candIntraPredModeA and candIntraPredModeB are not the same, candModeList[0] and candModeList[1] may be set as candIntraPredModeA and candIntraPredModeB, respectively. When both candIntraPredModeA and candIntraPredModeB are directional modes, at least one of candModeList[2] or candModeList[3] may be set as a non-directional mode. For example, candModeList[2] and candModeList[3] may be set as a PLANAR mode and a DC mode, respectively. On the other hand, at least one of candModeList[4] or candModeList[5] may be determined based on a comparison of a size between candIntraPredModeA and candIntraPredModeB. For example, when candIntraPredModeA is greater than candIntraPredModeB, candModeList[4] may be derived as a mode subtracting 1 from the maximum value, candIntraPredModeA, and candModeList[5] may be derived as a mode adding 1 to the maximum value, candIntraPredModeA. But, when a difference value between candIntraPredModeA and candIntraPredModeB is greater than or equal to a predetermined threshold value, candModeList[4] may be derived as a mode subtracting 1 or 2 from the maximum value, candIntraPredModeA, and candModeList[5] may be derived as a mode adding 1 or 2 to the maximum value, candIntraPredModeA. The threshold value may be an arbitrary natural number belonging to a range from 1 to 64. For example, the threshold value may be set as 1 or 2, or may be set as 62, 63, or 64.

[CASE 4] When any one of candIntraPredModeA and candIntraPredModeB is greater than or equal to 2 and the other is less than 2, a MPM candidate may be set as at least one of candIntraModeMax, INTRA_PLANAR/INTRA_DC, candIntraModeMax-1, candIntraModeMax+1, candIntraModeMax-2, candIntraModeMax+2 or a mode vertical to candIntraModeMax. In this case, a value of candIntraModeMax represents the larger value of candIntraPredModeA and candIntraPredModeB. A value of candIntraModeMin may be set as the smaller value of candIntraPredModeA and candIntraPredModeB.

Concretely, for example, when candIntraPredModeMin is INTRA_PLNAR, candModeList[2] may be set as INTRA_DC and when candIntraPredModeMin is INTRA_DC, it may be set as INTRA_PLANAR. cacandModeList[3] may be set as candIntraPredModeMax-1 (i.e., 2+((candIntraPredModeMax+62) % 65)), candModeList[4] may be set as candIntraPredModeMax+1 (i.e., 2+((candIntraPredModeMax-1) % 65)) and candModeList[5] may be set as a mode vertical to candIntraPredMax (i.e., candModeList[5]=2+((candIntraPredModeMax+94) % 65)).

But, in the above-described example, an index assigned to a MPM candidate is just an example and does not limit a position in a candidate group. Accordingly, arrangement of MPM candidates in a candidate group may be performed in a priority different from the above-described embodiment.

The above-described candidate group may be classified into m candidate groups. m may be an integer such as 2, 3, 4, or more. Hereinafter, for convenience of description, it is assumed that a candidate group is classified into a first candidate group and a second candidate group.

An encoding/decoding device may select any one of a first candidate group or a second candidate group. The selection may be performed based on a flag specifying whether an intra prediction mode of a current block belongs to a first candidate group or a second candidate group (hereinafter, a second flag). For example, when a second flag is a first value, an intra prediction mode of a current block may be derived from a first candidate group and otherwise, an intra prediction mode of a current block may be derived from a second candidate group.

Meanwhile, the second flag may be signaled only when the above-described first flag is a first value. In addition, the second flag may be signaled only when an intra reference line of a current block is determined as an adjacent intra reference line. When a current block refers to a non-adjacent pixel line, it may be restricted so that a MPM candidate of a first candidate group is not used. In addition, inversely, according to a second flag, when an intra prediction mode of a current block is derived from a first candidate group, it may be restricted so that a current block does not refer to a non-adjacent pixel line. A method of signaling a first flag will be described by referring to FIGS. 15 to 17.

Herein, a first candidate group may be configured with a predefined default mode. The default mode may be at least one of a directional mode or a non-directional mode. For example, a directional mode may include at least one of a vertical mode, a horizontal mode or a diagonal mode. A non-directional mode may include at least one of a Planar mode or a DC mode.

A first candidate group may be configured only with r non-directional modes or directional modes. r may be an integer such as 1, 2, 3, 4, 5, or more. r may be a fixed value which is pre-promised in an encoding/decoding device or may be variably determined based on a predetermined encoding parameter. When a plurality of default modes are included in a first candidate group, an index specifying any one of a plurality of default modes may be signaled. A default mode corresponding to a signaled index may be set as an intra prediction mode of a current block. On the other hand, when a first candidate group is configured with one default mode, the index may not be signaled and an intra prediction mode of a current block may be set as a default mode of a first candidate group.

Meanwhile, a second candidate group may include a plurality of MPM candidates. But, it may be restricted so that a second candidate group does not include a default mode belonging to a first candidate group. The number of the MPM candidates may be 2, 3, 4, 5, 6, or more. The number of MPM candidates may be a fixed value which is pre-promised in an encoding/decoding device or may be variably determined based on an encoding parameter. A MPM candidate may be derived based on an intra-prediction mode of a surrounding block adjacent to a current block. A surrounding block may be a block adjacent to at least one of a left, a top, a top-left, a bottom-left or a top-right of a current block.

Concretely, a MPM candidate may be determined by considering whether an intra prediction mode of a left block (candIntraPredModeA) and an intra prediction mode of a top block (candIntraPredModeB) are the same and whether candIntraPredModeA and candIntraPredModeB are a non-directional mode.

[CASE 1] For example, when candIntraPredModeA and candIntraPredModeB are the same and candIntraPredModeA is not a non-directional mode, a MPM candidate of a current block may include at least one of candIntraPredModeA, (candIntraPredModeA-n), (candIntraPredModeA+n) or a non-directional mode. Herein, n may be an integer such as 1, 2, or more. The non-directional mode may include at least one of a Planar mode or a DC mode. In an example, a MPM candidate of a current block may be determined as in the following Table 1. An index in Table 1 specifies a position or a priority of a MPM candidate, but is not limited thereto.

TABLE 1

| Index | MPM candidate |
|---|---|
| 0 | candIntraPredModeA |
| 1 | 2 + ((candIntraPredModeA + 61) % 64) |
| 2 | 2 + ((candIntraPredModeA − 1) % 64) |
| 3 | 2 + ((candIntraPredModeA + 60) % 64) |
| 4 | 2 + ((candIntraPredModeA % 64) |

[CASE 2] Alternatively, when candIntraPredModeA and candIntraPredModeB are not the same and both candIntraPredModeA and candIntraPredModeB are not a non-directional mode, a MPM candidate of a current block may include at least one of candIntraPredModeA, candIntraPredModeB, (maxAB−n), (maxAB+n), (minAB−n), (minAB+n) or a non-directional mode. Herein, maxAB and minAB may mean the maximum value and the minimum value of candIntraPredModeA and candIntraPredModeB, respectively, and n may be an integer such as 1, 2, or more. The non-directional mode may include at least one of a Planar mode or a DC mode. In an example, a MPM candidate of a current block may be determined as in the following Table 2. An index in Table 2 specifies a position or a priority of a MPM candidate, but it is not limited thereto.

Meanwhile, based on a difference value between candIntraPredModeA and candIntraPredModeB, a MPM candidate may be differently determined. For example, when a difference value between candIntraPredModeA and candIntraPredModeB belongs to a predetermined threshold range, a MPM candidate 1 in Table 2 may be applied and otherwise, a MPM candidate 2 may be applied. Herein, a threshold range may be any one of a first range which is greater than or equal to 62, a second range which is greater than or equal to 63 or a third range which is greater than or equal to 64.

TABLE 2

| Index | MPM candidate 1 | MPM candidate 2 |
|---|---|---|
| 0 | candIntraPredModeA | candIntraPredModeA |
| 1 | candIntraPredModeB | candIntraPredModeB |
| 2 | 2 + ((minAB − 1) % 64) | 2 + ((minAB + 61) % 64) |
| 3 | 2 + ((maxAB + 61) % 64) | 2 + ((minAB − 1) % 64) |
| 4 | 2 + (minAB % 64) | 2 + ((maxAB + 61) % 64) |

But, when a difference value between candIntraPredModeA and candIntraPredModeB is 1 or 2, a MPM candidate may be determined as in the following Table 3, instead of a MPM candidate 2 in Table 2. For example, when the difference value is 1, a MPM candidate 3 may be applied and when the difference value is 2, a MPM candidate 4 may be applied. Alternatively, inversely, when the difference value is 1, a MPM candidate 4 may be applied and when the difference value is 2, a MPM candidate 3 may be applied.

TABLE 3

| Index | MPM candidate 3 | MPM candidate 4 |
|---|---|---|
| 0 | candIntraPredModeA | candIntraPredModeA |
| 1 | candIntraPredModeB | candIntraPredModeB |
| 2 | 2 + ((minAB + 61) % 64) | 2 + ((minAB − 1) % 64) |
| 3 | 2 + ((maxAB − 1) % 64) | 2 + ((minAB + 61) % 64) |
| 4 | 2 + ((minAB + 60) % 64) | 2 + ((maxAB − 1) % 64) |

In the above-described Table 2 and 3, any one of MPM candidates is derived based on minAB and the other is derived based on maxAB. But, it is not limited thereto and a MPM candidate may be derived based on maxAB regardless of minAB and inversely, may be derived based on minAB regardless of maxAB.

[CASE 3] When candIntraPredModeA and candIntraPredModeB are not the same and only any one of candIntraPredModeA and candIntraPredModeB is a non-directional mode, a MPM candidate of a current block may include at least one of maxAB, (maxAB−n), (maxAB+n) or a non-directional mode. Herein, maxAB may mean the maximum value of candIntraPredModeA and candIntraPredModeB and n may be an integer such as 1, 2, more. The non-directional mode may include at least one of a Planar mode or a DC mode. In an example, a MPM candidate of a current block may be determined as in the following Table 4. An index in Table 4 specifies a position or a priority of a MPM candidate, but is not limited thereto.

TABLE 4

| Index | MPM candidate |
|---|---|
| 0 | maxAB |
| 1 | 2 + ((maxAB + 61) % 64) |
| 2 | 2 + ((maxAB − 1) % 64) |
| 3 | 2 + ((maxAB + 60) % 64) |
| 4 | 2 + (maxAB % 64) |

[CASE 4] When candIntraPredModeA and candIntraPredModeB are not the same and both candIntraPredModeA and candIntraPredModeB are non-directional modes, a MPM candidate of a current block may include at least one of a non-directional mode, a vertical mode, a horizontal mode, (a vertical mode−m), (a vertical mode+m), (a horizontal mode−m) or (a horizontal mode+m). Herein, m may be an integer such as 1, 2, 3, 4, or more. The non-directional mode may include at least one of a Planar mode or a DC mode. In an example, a MPM candidate of a current block may be determined as in the following Table 5. An index in Table 5 specifies a position or a priority of a MPM candidate, but it is not limited thereto. For example, an index 1 may be assigned to a horizontal mode or the largest index may be assigned. In addition, a MPM candidate may include at least one of a diagonal mode (e.g., a mode 2, a mode 34, a mode 66), (a diagonal mode−m) or (a diagonal mode+m).

TABLE 5

| Index | MPM candidate |
|---|---|
| 0 | INTRA_DC |
| 1 | Vertical Mode |
| 2 | Horizontal Mode |
| 3 | (Vertical Mode − 4) |
| 4 | (Vertical Mode + 4) |

An intra prediction mode decoded in the above-described process may be changed based on a predetermined offset.

Application of the offset may be selectively performed based on at least one of block attributes, i.e., a size, a shape, partition information, a partition depth, a value of an intra prediction mode or a component type. Herein, a block may mean the current block and/or a surrounding block of a current block.

The partition information may include at least one of first information representing whether a current block is partitioned into a plurality of sub-blocks, second information representing a partition direction (e.g., horizontal or vertical) or third information on the number of partitioned sub-blocks. The partition information may be encoded and signaled in an encoding device. Alternatively, part of the partition information may be variably determined in a decoding device based on the above-mentioned block attributes and may be set as a fixed value which is predefined in an encoding/decoding device.

For example, when the first information is a first value, a current block may be partitioned into a plurality of sub-blocks and otherwise, a current block may not be partitioned into a plurality of sub-blocks (NO_SPLIT). When a current block is partitioned into a plurality of sub-blocks, a current block may be horizontally partitioned (HOR_SPLIT) or vertically partitioned (VER_SPLIT) based on the second information. In this case, a current block may be partitioned into k sub-blocks. In this case, k may be an integer such as 2, 3, 4 or more. Alternatively, k may be limited to exponentiation of 2 such as 1, 2, 4, etc. Alternatively, when at least one of a width or a height of a current block is 4 (e.g., 4×8, 8×4), the k may be set to be 2 and otherwise, the k may be set to be 4, 8, or 16. When a current block is not partitioned (NO_SPLIT), the k may be set to be 1.

The current block may be partitioned into sub-blocks with the same width and height and may be partitioned into sub-blocks with a different width and height. A current block may be partitioned into pre-promised N×M block units (e.g., 2×2, 2×4, 4×4, 8×4, 8×8, etc.) in an encoding/decoding device regardless of the above-mentioned block attributes.

The offset may be applied only when a size of a current block is smaller than or the same as a predetermined threshold value (T1). In this case, a threshold value (T1) may mean the maximum block size to which an offset is applied. Alternatively, it may be applied only when a size of a current block is greater than or the same as a predetermined threshold value (T2). In this case, a threshold value (T2) may mean the minimum block size to which an offset is applied. The threshold value may be signaled in a bitstream. Alternatively, it may be variably determined in a decoding device based on at least one of the above-described block attributes and may be a fixed value which is pre-promised in an encoding/decoding device.

Alternatively, the offset may be applied only when a shape of a current block is non-square. In an example, when the following condition is satisfied, a predetermined offset (e.g., 65) may be added to IntraPredMode of a current block.

nW is greater than nH
IntraPredMode is greater than or equal to 2
IntraPredMode is less than (whRatio>1)?(8+2*whRatio):8

In this case, nW and nH may mean a width and a height of a current block, respectively, and whRatio may be set as Abs(Log 2(nW/nH)).

In addition, when the following condition is satisfied, a predetermined offset (e.g., 67) may be subtracted from IntraPredMode of a current block.

nH is greater than nW
IntraPredMode is less than or equal to 66
IntraPredMode is greater than (whRatio>1)?(60−2*whRatio):60

As described above, a final intra prediction mode may be determined by adding/subtracting an offset to/from an intra prediction mode (IntraPredMode) of a current block by considering attributes of a current block. But, it is not limited thereto and application of an offset may be performed identically/similarly by considering attributes of a sub-block belonging to a current block. A change of an intra prediction mode will be described by referring to FIGS. 18 to 21.

In reference to FIG. 13, intra prediction of a current block may be performed based on the determined intra reference line and an intra prediction mode.

Concretely, intra prediction may be performed in a unit of a current block or may be performed in a unit of a predetermined sub-block configuring a current block. Intra prediction in a unit of a sub-block will be described by referring to FIG. 22.

In addition, a prediction value according to the intra prediction may be modified. A modification process is performed based on a predetermined reference pixel and a weight, which will be described by referring to FIGS. 23 and 24.

Figure 14:
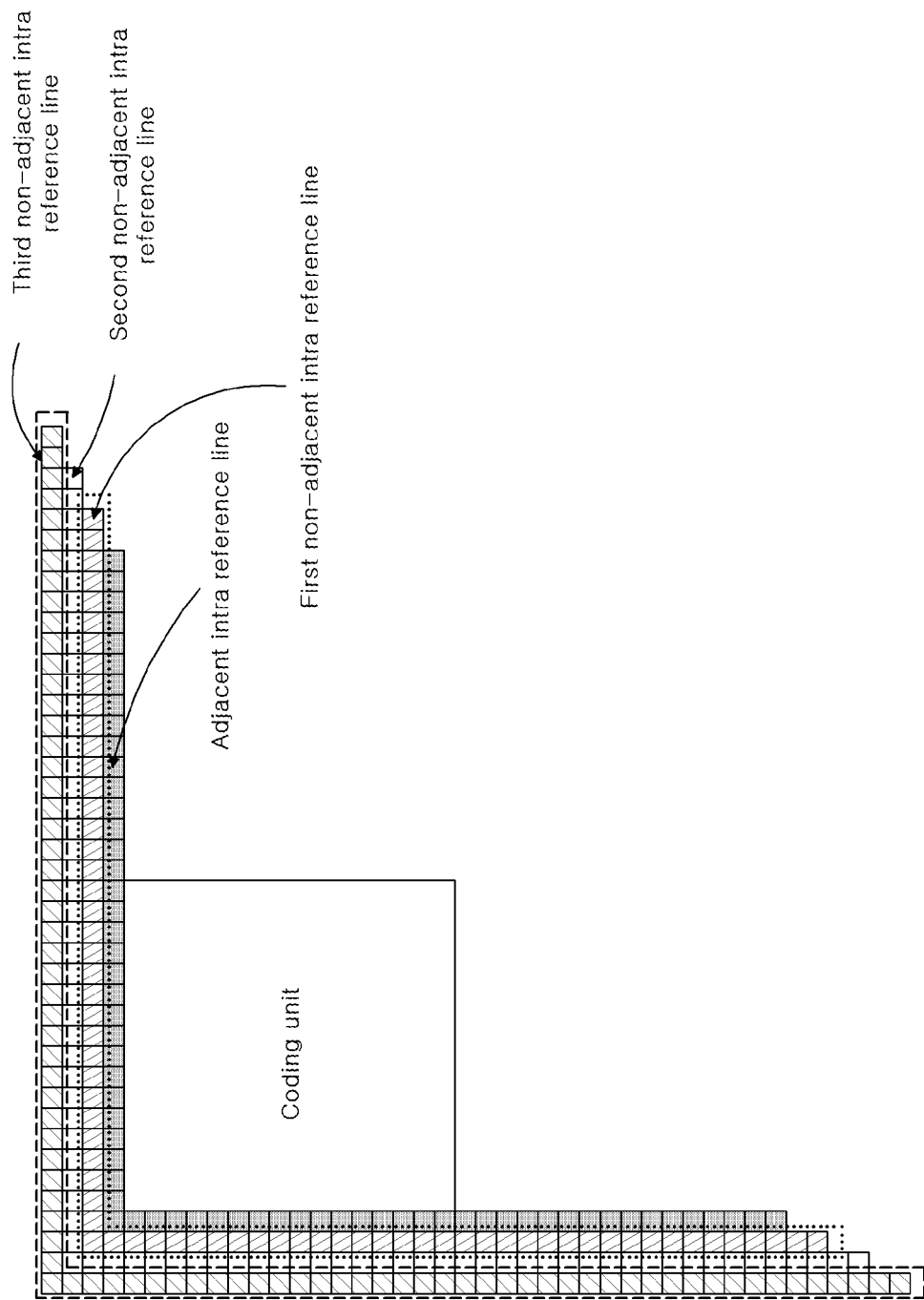
FIG. 14 shows a method in which an intra reference line of a current block is determined as an embodiment to which the present disclosure is applied.

FIG. 14 shows a method in which an intra reference line of a current block is determined as an embodiment to which the present disclosure is applied.

In reference to FIG. 14, at least one of a plurality of intra reference lines may be used for intra prediction of a current block.

In an example, intra prediction may be performed by selecting any one of a plurality of intra reference lines configured with an adjacent intra reference line and a non-adjacent intra reference line, which is defined as a multi-line intra prediction method. A non-adjacent intra reference line may include at least one of a first non-adjacent intra reference line (a non-adjacent reference line index 1), a second non-adjacent intra reference line (a non-adjacent reference line index 2) or a third non-adjacent intra reference line (a non-adjacent reference line index 3). Only some of non-adjacent intra reference lines may be used. In an example, only a first non-adjacent intra reference line and a second non-adjacent intra reference line may be used, or only a first non-adjacent intra reference line and a third non-adjacent intra reference line may be used.

An intra reference line index (intra_luma_ref_idx), a syntax specifying a reference line used for intra prediction, may be signaled in a unit of a coding unit.

Concretely, when an adjacent intra reference line, a first non-adjacent intra reference line and a third non-adjacent intra reference line are used, intra_luma_ref_idx may be defined as in the following Table 6.

TABLE 6

| intra_luma_ref_idx[x0][y0] | Reference Line used for Intra Prediction |
|---|---|
| 0 | Adjacent Intra Reference Line |
| 1 | First Non-adjacent Intra Reference Line |
| 2 | Third Non-adjacent Intra Reference Line |

Alternatively, according to a size, a shape, or an intra prediction mode of a current block, a position of a non-adjacent reference line may be specified. For example, when a line index is 0, it may represent an adjacent intra reference line and when a line index is 1, it may represent a first non-adjacent intra reference line. Meanwhile, according to a size, a shape, or an intra prediction mode of a current block, when a line index is 2, it may represent a second non-adjacent intra reference line or a third non-adjacent intra reference line.

According to an intra mode, an available non-adjacent reference line may be determined. For example, when a diagonal mode is used, only at least one of an adjacent reference line, a first non-adjacent reference line or a third non-adjacent reference line may be used, and it may be set to use only at least one of an adjacent reference line, a first non-adjacent reference line or a second non-adjacent reference line in a vertical or horizontal mode.

When a non-adjacent intra reference line is used, it may be set not to use a non-directional mode. In other words, when a non-adjacent intra reference line is used, it may be restricted so that a DC mode or a planar mode is not used. Inversely, when a current block uses a non-directional mode, a current block may be set not to use a non-adjacent intra reference line. For example, when a current block is a non-directional mode, the line index may not be signaled and may be implicitly set to be 0.

Figure 15:
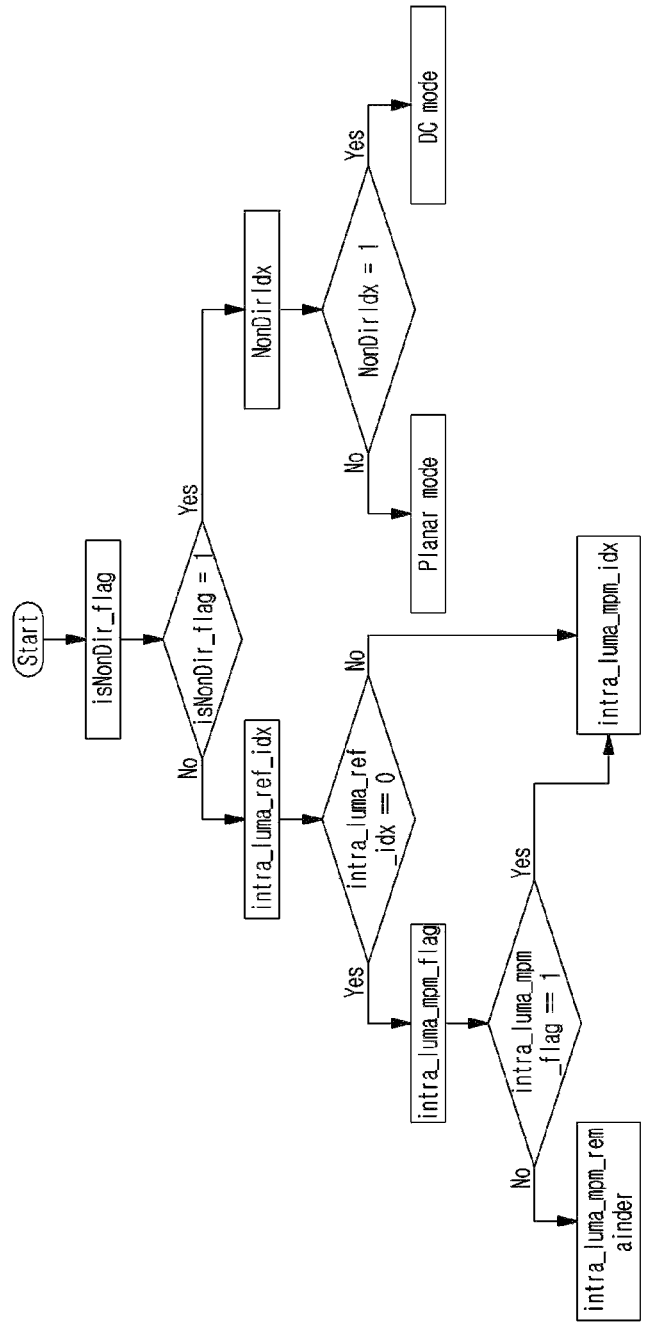
FIGS. 15 to 17 show a signaling method of a second flag as an embodiment to which the present disclosure is applied.
Figure 16:
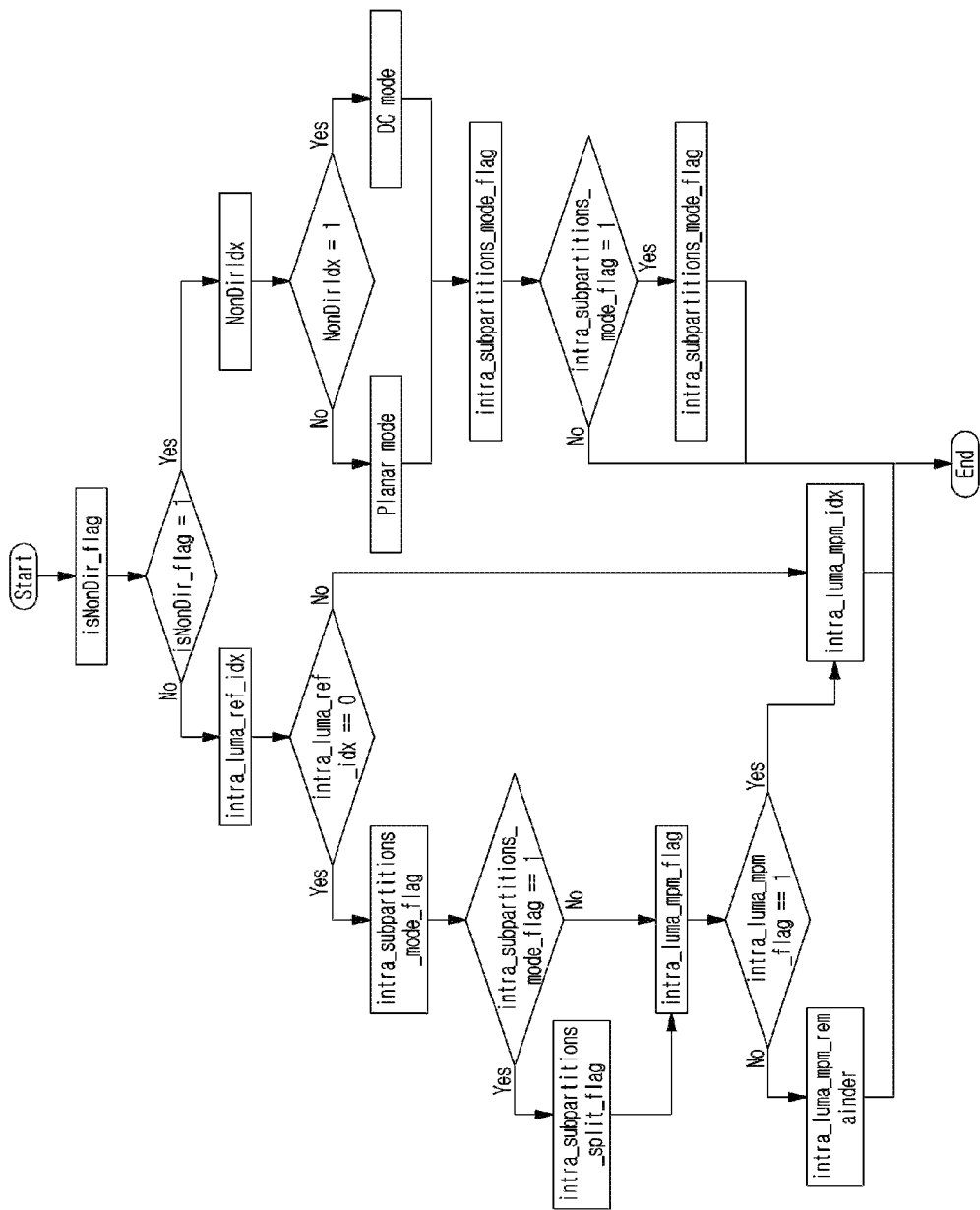
Figure 17:
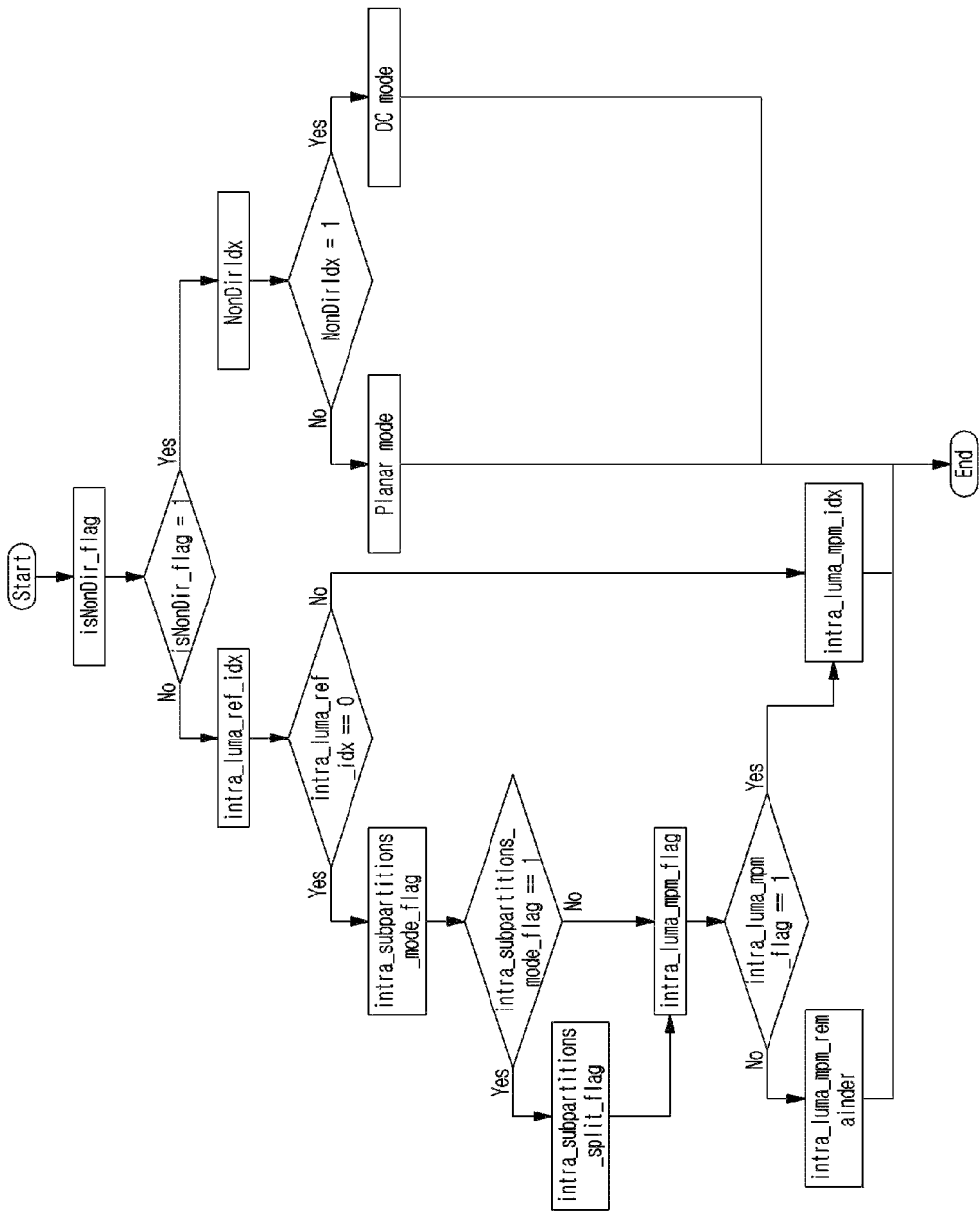

FIGS. 15 to 17 show a signaling method of a second flag as an embodiment to which the present disclosure is applied.

A second flag according to the present disclosure may represent whether an intra prediction mode of a current block is derived from a first candidate group configured with a default mode. A default mode is the same as described above and in this case, a detailed description will be omitted. For convenience of description, it is described on the assumption that the default mode is a non-directional mode in this embodiment. In reference to FIG. 15, a second flag representing whether an intra prediction mode is a non-directional mode (a DC or Planar mode) (isNonDir_flag) may be signaled in a bitstream. When a value of isNonDir_flag is 1, it represents that an intra prediction mode is a non-directional mode and a non-adjacent intra reference line may be set not to be used as an intra reference line. A flag (NonDirIdx) representing whether of a DC mode or a Planar mode among non-directional modes may be signaled in a bitstream. Only when a value of isNonDir_flag is 1, Non-DirIdx may be signaled.

As in FIG. 15, only when a value of isNonDir_flag is 0, intra_luma_ref_idx specifying an intra reference line may be signaled. When isNonDir_flag is 1, only an adjacent intra reference line is used for intra prediction and a non-adjacent intra reference line is not used.

In reference to FIG. 16, when an intra prediction mode of a coding block is a DC or Planar mode (i.e., when a value of isNonDirag is 1), a flag representing whether a subpartition-based intra prediction method is used (intrasubpartitionsmodeflag) may be signaled in a bitstream and when a value of intrasubpartitionsmodefag is 1, a flag representing whether it is divided into partitions in a vertical direction or partitions in a horizontal direction (intrasubpartitionssplit-flag) may be signaled. Concretely, an intra prediction mode may be parsed by using a syntax table as in the following Table 7.

TABLE 7

|  | Descriptor |
|---|---|
| coding_unit( x0, y0, cbWidth, cbHeight, treeType ) { | |
| if( tile_group_type != I ) { | |
| if( treeType != DUAL_TREE_CHROMA ) | |
| cu_skip_flag[ x0 ][ y0 ] | ae(v) |
| if( cu_skip_flag[ x0 ][ y0 ]= =0 ) | |
| pred_mode_flag | ae(v) |
| } | |
| if( CuPredMode[ x0 ][ y0 ] = = MODE_INTRA ) { | |
| if( sps_pcm_enabled_flag &&cbWidth >= MinIpcmCbSizeY && cbWidth <= MaxIpcmCbSizeY &&cbHeight >= MinIpcmCbSizeY && cbHeight <= MaxIpcmCbSizeY ) | |
| ... | ae(v) |
| } else { | |
| if( treeType = = SINGLE_TREE \|\| treeType = =DUAL_TREE_LUMA ) | |
| { | |
| isNonDir_flag | ae(v) |
| if(isNonDir_flag){ | |
| NonDirIdx | ae(v) |
| } | |
| if ( ( cbWidth <= MaxTbSizeY \|\| cbHeight <= MaxTbSizeY ) && ( cbWidth * cbHeight > MinTbSize Y * MinTbSize Y )) | |
| intra_subpartitions_mode_flag[ x0 ][ y0 ] | ae(v) |
| if( intra_subpartitions_mode_flag[ x0 ][ y0 ] = = 1 && cbWidth <= MaxTbSize Y && cbHeight <= MaxTbSizeY ) | |
| intra_subpartitions_split_flag[ x0 ][ y0 ] | ae(v) |
| } | |
| if(!isNonDir_flag & & ( y0 % CtbSizeY ) > 0 ) | |

TABLE 7-continued

| | Descriptor |
|---|---|
| intra_luma_ref_idx[ x0 ][ y0 ] | ae(v) |
|   if (intra_luma_ref_idx[ x0 ][ y0 ] = = 0 && ( cbWidth <= Max TbSize Y \| \| cbHeight <= MaxTbSizeY ) && ( cbWidth * cbHeight > MinTbSize Y * MinTbSize Y )) | |
|   intra_subpartitions_mode_flag[ x0 ][ y0 ] | ae(v) |
|     if( intra_subpartitions_mode_flag[ x0 ][ y0 ] = = 1 && cbWidth <= MaxTbSizeY && cbHeight <= MaxTbSize Y ) | |
| intra_subpartitions_split_flag[ x0 ][ y0 ] | ae(v) |
|   if( intra_luma_ref_idx[ x0 ][ y0 ] = = 0 & & intra_subpartitions_mode_flag[ x0 ][ y0 ]= = 0 ) | |
| intra_luma_mpm_flag[ x0 ][ y0 ] | ae(v) |
| if( intra_luma_mpm_flag[ x0 ][ y0 ] ) | |
| intra_luma_mpm_idx[ x0 ][ y0 ] | ae(v) |
| else | |
| intra_luma_mpm_remainder[ x0 ][ y0 ] | ae(v) |
| } | |
| if( treeType = = SINGLE_TREE \| \| tree Type = = DUAL_TREE_CHROMA ) | |
| intra_chroma_pred_mode[ x0 ][ y0 ] | ae(v) |
| } | |
| } else if( treeType != DUAL_TREE_CHROMA ) { /* MODE_INTER */ | |
|   ... | |
| } | |
| } | |

When an intra prediction mode of a coding unit is a non-directional prediction mode (e.g., a Planar or DC mode), a subpartition-based intra prediction method may be set not to be used. In reference to FIG. 17, when isNonDir_fag is 1, intra_subpartitions_mode_flag and intra_subpartitions_split_flag may not be signaled in an encoding step. Concretely, an intra prediction mode may be parsed by using a syntax table as in the following Tables 8 to 9.

TABLE 8

| | Descriptor |
|---|---|
| if( tile_group_type != I ) { | |
| if( treeType != DUAL_TREE_CHROMA ) | |
| cu_skip_flag[ x0 ][ y0 ] | ae(v) |
| if( cu_skip_flag[ x0 ][ y0 ]= = 0 ) | |
| pred_mode_flag | ae(v) |
| } | |
| if( CuPredMode[ x0 ][ y0 ] = = MODE_INTRA ) { | |
| if( sps_pcm_enabled_flag & & cbWidth >= MinIpcmCbSize Y & & cbWidth <= MaxIpcmCbSizeY && cbHeight >= MinIpcmCbSizeY & & cbHeight <= MaxIpcmCbSize Y ) | |
| ... | ae(v) |
| } else { | |
| if( treeType = = SINGLE_TREE \| \| treeType = = DUAL_TREE_LUMA ) { | |
| isNonDir_flag | ae(v) |
| if(isNonDir_flag){ | |
| NonDirIdx | ae(v) |
| } | |
| if(!isNonDir_flag && ( y0 % CtbSizeY ) > 0 ) | |
| intra_luma_ref_idx[ x0 ][ y0 ] | ae(v) |
|   if (intra_luma_ref_idx[ x0 ][ y0 ] = = 0 & & ( cbWidth <= MaxTbSize Y \| \| cbHeight <= MaxTbSizeY ) && ( cbWidth * cbHeight > MinTbSize Y * Min TbSize Y )) | |
| intra_subpartitions_mode_flag[ x0 ][ y0 ] | ae(v) |
|     if( intra_subpartitions_mode_flag[ x0 ][ y0 ] = = 1 && cbWidth <= MaxTbSizeY && cbHeight <= MaxTbSize Y ) | |
| intra_subpartitions_split_flag[ x0 ][ y0 ] | ae(v) |
|   if( intra_luma_ref_idx[ x0 ][ y0 ] = = 0 & & intra_subpartitions_mode_flag[ x0 ][ y0 ]= = 0 ) | |
| intra_luma_mpm_flag[ x0 ][ y0 ] | ae(v) |
| if( intra_luma_mpm_flag[ x0 ][ y0 ] ) | |
| intra_luma_mpm_idx[ x0 ][ y0 ] | ae(v) |
| else | |
| intra_luma_mpm_remainder[ x0 ][ y0 ] | ae(v) |
| } | |
| if( treeType = = SINGLE_TREE \| \| treeType = = DUAL_TREE_CHROMA ) | |

TABLE 8-continued

| | Descriptor |
|---|---|
| intra_chroma_pred_mode[ x0 ][ y0 ] | ae(v) |
| } | |
| } else if( treeType != DUAL_TREE_CHROMA ) { /* MODE_INTER */ | |
| ... | |
| } | |
| } | |

TABLE 9

| | Descriptor |
|---|---|
| coding_unit( x0, y0, cbWidth, cbHeight, treeType ) { | |
| if( tile_group_type != I ) { | |
| if( treeType != DUAL_TREE_CHROMA ) | |
| cu_skip_flag[ x0 ][ y0 ] | ae(v) |
| if( cu_skip_flag[ x0 ][ y0 ]= = 0 ) | |
| pred_mode_flag | ae(v) |
| } | |
| if( CuPredMode[ x0 ][ y0 ] = = MODE_INTRA ) { | |
| if( sps_pcm_enabled_flag &&cbWidth >= MinIpcmCbSizeY && cbWidth <= MaxIpcmCbSizeY &&cbHeight >= MinIpcmCbSizeY && cbHeight <= MaxIpcmCbSize Y ) | |
| ... | ae(v) |
| } else { | |
| if( treeType = = SINGLE_TREE \| \| treeType= =DUAL_TREE_LUMA ) | |
| { | |
| isNonDir_flag | ae(v) |
| if(isNonDir_flag){ | |
| NonDirIdx | ae(v) |
| } | |
| if(!isNonDir_flag){ | |
| intra_luma_mpm_flag[ x0 ][ y0 ] | ae(v) |
| if( intra_luma_mpm_flag[ x0 ][ y0 ] ) | |
| intra_luma_mpm_idx[ x0 ][ y0 ] | ae(v) |
| if( ( y0 % CtbSizeY ) > 0 ) | |
| intra_luma_ref_idx[ x0 ][ y0 ] | ae(v) |
| if (intra_luma_ref_idx[ x0 ][ y0 ] = = 0 && ( cbWidth <= MaxTbSizeY \| \| cbHeight <= MaxTbSizeY ) && ( cbWidth * cbHeight > Min TbSize * MinTbSize Y )) | |
| intra_subpartitions_mode_flag[ x0 ][ y0 ] | ae(v) |
| if( intra_subpartitions_mode_flag[ x0 ][ y0 ] = = 1 & & cbWidth <= MaxTbSizeY && cbHeight <= MaxTbSizeY ) | |
| intra_subpartitions_split_flag[ x0 ][ y0 ] | ae(v) |
| } | |
| else | |
| intra_luma_mpm_remainder[ x0 ][ y0 ] | ae(v) |
| } | |
| if( treeType = = SINGLE_TREE \| \| tree Type = = DUAL_TREE_CHROMA ) | |
| intra_chroma_pred_mode[ x0 ][ y0 ] | ae(v) |
| } | |
| else if( treeType != DUAL_TREE_CHROMA ) { /* MODE_INTER */ | |
| ... | |
| } | |
| } | |

Alternatively, a second flag representing whether an intra prediction mode of a current block is a predefined default mode (intra_default_mode_flag) may be signaled in a bitstream. When a value of intra_default_mode_flag is 1, it represents that an intra prediction mode is a default mode. An index indicating which mode of default modes is used (intra_defualt_mode_idx) may be signaled in a bitstream. Only when a value of intra_default_mode_flag is 1, intra_default_mode_idx may be signaled.

Only when a value of intra_default_mode_flag is 0, intra_luma_ref_idx specifying an intra reference line may be signaled. Inversely, only when intra_luma_ref_idx is 0, intra_default_mode_flag may be signaled.

When intra_default_mode_flag is 1, there may be a limit that only an adjacent intra reference line is used for intra prediction. Concretely, an intra prediction mode may be parsed by using a syntax table as in the following Table 10.

TABLE 10

| | Descriptor |
|---|---|
| coding_unit( x0, y0, cbWidth, cbHeight, treeType ) { <br> if( tile_group_type != I ) { <br> if( treeType != DUAL_TREE_CHROMA ) <br> cu_skip_flag[ x0 ][ y0 ] | <br><br><br> ae(v) |
| if( cu_skip_flag[ x0 ][ y0 ]= = 0 ) <br> pred_mode_flag | <br> ae(v) |
| } <br> if( CuPredMode[ x0 ][ y0 ] = = MODE_INTRA ) { <br> if( sps_pcm_enabled_flag &&cbWidth >= MinIpcmCbSizeY && cbWidth <br> <= MaxIpcmCbSizeY &&cbHeight >= MinIpcmCbSizeY && cbHeight <= <br> MaxIpcmCbSize Y ) <br> ... | <br><br><br><br><br> ae(v) |
| } else { <br> if( treeType = = SINGLE_TREE | | treeType = = DUAL_TREE_LUMA ) <br> { <br> intra_default_mode_flag | <br><br><br> ae(v) |
| if(intra_default_mode_flag){ <br> intra_default_mode_idx | <br> ae(v) |
| } <br> if(!intra_default_mode_flag && ( y0 % CtbSizeY ) > 0 ) <br> intra_luma_ref_idx[ x0 ][ y0 ] <br>     if (intra_luma_ref_idx[ x0 ][ y0 ] = = 0 && ( cbWidth <= <br> Max TbSize Y | | cbHeight <= MaxTbSizeY ) && ( cbWidth * cbHeight <br> > MinTbSize Y * MinTbSize Y )) <br> intra_subpartitions_mode_flag[ x0 ][ y0 ] | <br><br> ae(v) <br><br><br><br> ae(v) |
|     if( intra_subpartitions_mode_flag[ x0 ][ y0 ] = = 1 && <br> cbWidth <= MaxTbSizeY && cbHeight <= MaxTbSize Y ) <br> intra_subpartitions_split_flag[ x0 ][ y0 ] <br>     if( intra_luma_ref_idx[ x0 ][ y0 ] = = 0 & & <br> intra_subpartitions_mode_flag[ x0 ][ y0 ]= = 0 ) <br> intra_luma_mpm_flag[ x0 ][ y0 ] | <br><br> ae(v) <br><br><br> ae(v) |
| if( intra_luma_mpm_flag[ x0 ][ y0 ] ) <br> intra_luma_mpm_idx[ x0 ][ y0 ] <br> else <br> intra_luma_mpm_remainder[ x0 ][ y0 ] | <br> ae(v) <br><br> ae(v) |
| } <br> if( tree Type = = SINGLE_TREE | | treeType = = <br> DUAL_TREE_CHROMA ) <br> intra_chroma_pred_mode[ x0 ][ y0 ] | <br><br><br> ae(v) |
| } <br> } else if( treeType != DUAL_TREE_CHROMA ) { /* MODE_INTER */ <br>   ... <br> } <br> } | |

For example, a default mode may be set as at least one of a DC mode, a Planar mode, a horizontal mode or a vertical mode.

For another example, a default mode may be set as at least one of a DC mode, a Planar mode, a horizontal mode, a vertical mode or a diagonal mode (e.g., INTRA_ANGULAR2, INTRA_ANGULAR66).

For another example, a default mode may be set as at least one of a horizontal mode, a vertical mode or a diagonal mode (e.g., INTRA_ANGULAR2, INTRA_ANGULAR66, INTRA_ANGUAR34).

FIGS. 18 to 21 show a method in which a derived intra prediction mode is changed as an embodiment to which the present disclosure is applied.

Figure 18:
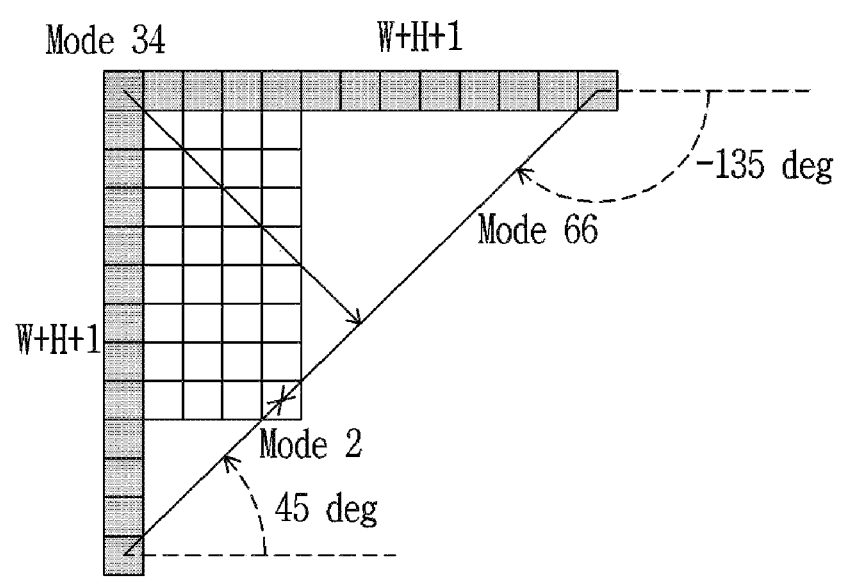
FIGS. 18 to 21 show a method in which a derived intra prediction mode is changed as an embodiment to which the present disclosure is applied.

A prediction angle of a directional mode may be set between 45 degrees and −135 degrees as in FIG. 18. When intra prediction is performed in a nonsquare coding unit, a disadvantage that a current sample is predicted by using an intra reference sample distant from a current sample instead of an intra reference sample close to a current sample may be generated due to a predefined prediction angle.

For example, as in the left picture of FIG. 19, for a coding unit that a width of a coding unit is greater than a height of a coding unit (hereinafter, a coding unit in a horizontal direction), intra prediction may be performed in a distant L instead of a close sample T. For another example, as in the right picture of FIG. 19, for a coding unit that a height of a coding unit is greater than a width of a coding unit (hereinafter, a coding unit in a vertical direction), intra prediction may be performed in a distant sample T instead of a close sample L. In a nonsquare coding unit, intra prediction may be performed at a prediction angle out of a predefined prediction angle, which is referred to as an wide-angle intra prediction mode.

An wide-angle intra prediction mode may have a prediction angle of (45−α) to (−135−β) and a prediction angle out of an angle used in the existing intra prediction mode is referred to as an wide-angle angle.

Figure 19:
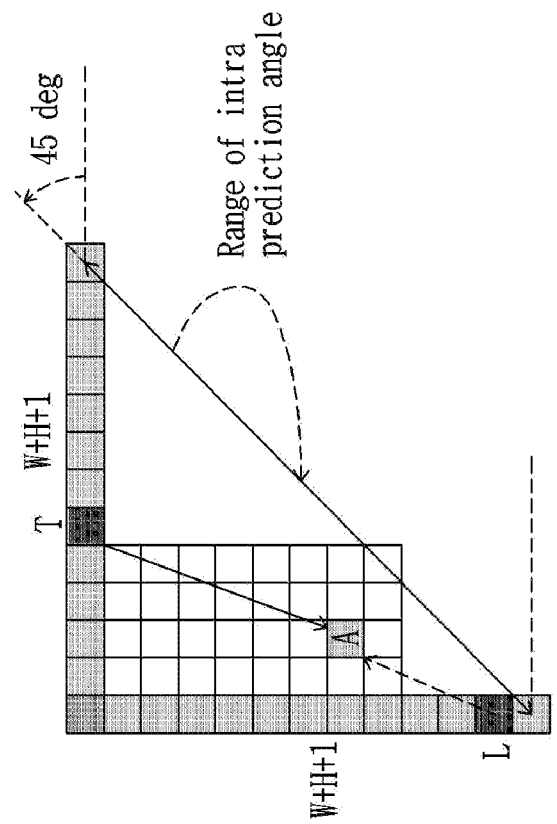
Figure 19:
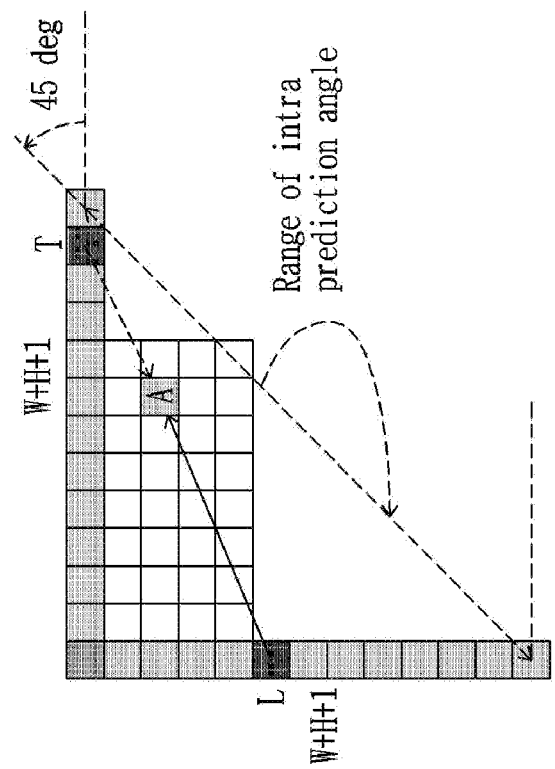

In the left picture of FIG. 19, a sample A in a coding unit in a horizontal direction may perform prediction from an intra reference sample T by using an wide-angle intra prediction mode.

In the right picture of FIG. 19, a sample A in a coding unit in a vertical direction may perform prediction from an intra reference sample L by using an wide-angle intra prediction mode.

An wide-angle intra prediction mode may use N+20 intra prediction modes by adding 20 wide-angle angles to N existing intra prediction modes. Concretely, for example, when 67 intra modes are used, a total of 87 intra prediction modes may be used by adding an wide-angle angle as in Table 11.

TABLE 11

| predMode Intra | −14 | −13 | −12 | −11 | −10 | −9 | −8 | −7 | −6 | −5 | −4 | −3 | −2 | −1 | 2 | 3 | 4 |
|---|---|---|---|---|---|---|---|---|---|---|---|---|---|---|---|---|---|
| intraPred Angle | 512 | 341 | 256 | 171 | 128 | 102 | 86 | 73 | 64 | 57 | 51 | 45 | 39 | 35 | 32 | 29 | 26 |
| predMode Intra | 5 | 6 | 7 | 8 | 9 | 10 | 11 | 12 | 13 | 14 | 15 | 16 | 17 | 18 | 19 | 20 | 21 |
| intraPred Angle | 23 | 20 | 18 | 16 | 14 | 12 | 10 | 8 | 6 | 4 | 3 | 2 | 1 | 0 | −1 | −2 | −3 |
| predMode Intra | 22 | 23 | 24 | 25 | 26 | 27 | 28 | 29 | 30 | 31 | 32 | 33 | 34 | 35 | 36 | 37 | 38 |
| intraPred Angle | −4 | −6 | −8 | −10 | −12 | −14 | −16 | −18 | −20 | −23 | −26 | −29 | −32 | −29 | −26 | −23 | −20 |
| predMode Intra | 39 | 40 | 41 | 42 | 43 | 44 | 45 | 46 | 47 | 48 | 49 | 50 | 51 | 52 | 53 | 54 | 55 |
| intraPred Angle | −18 | −16 | −14 | −12 | −10 | −8 | −6 | −4 | −3 | −2 | −1 | 0 | 1 | 2 | 3 | 4 | 6 |
| predMode Intra | 56 | 57 | 58 | 59 | 60 | 61 | 62 | 63 | 64 | 65 | 66 | 67 | 68 | 69 | 70 | 71 | 72 |
| intraPred Angle | 8 | 10 | 12 | 14 | 16 | 18 | 20 | 23 | 26 | 29 | 32 | 35 | 39 | 45 | 51 | 57 | 64 |
| predMode Intra | 73 | 74 | 75 | 76 | 77 | 78 | 79 | 80 | | | | | | | | | |
| intraPred Angle | 73 | 86 | 102 | 128 | 171 | 256 | 341 | 512 | | | | | | | | | |

Figure 20:
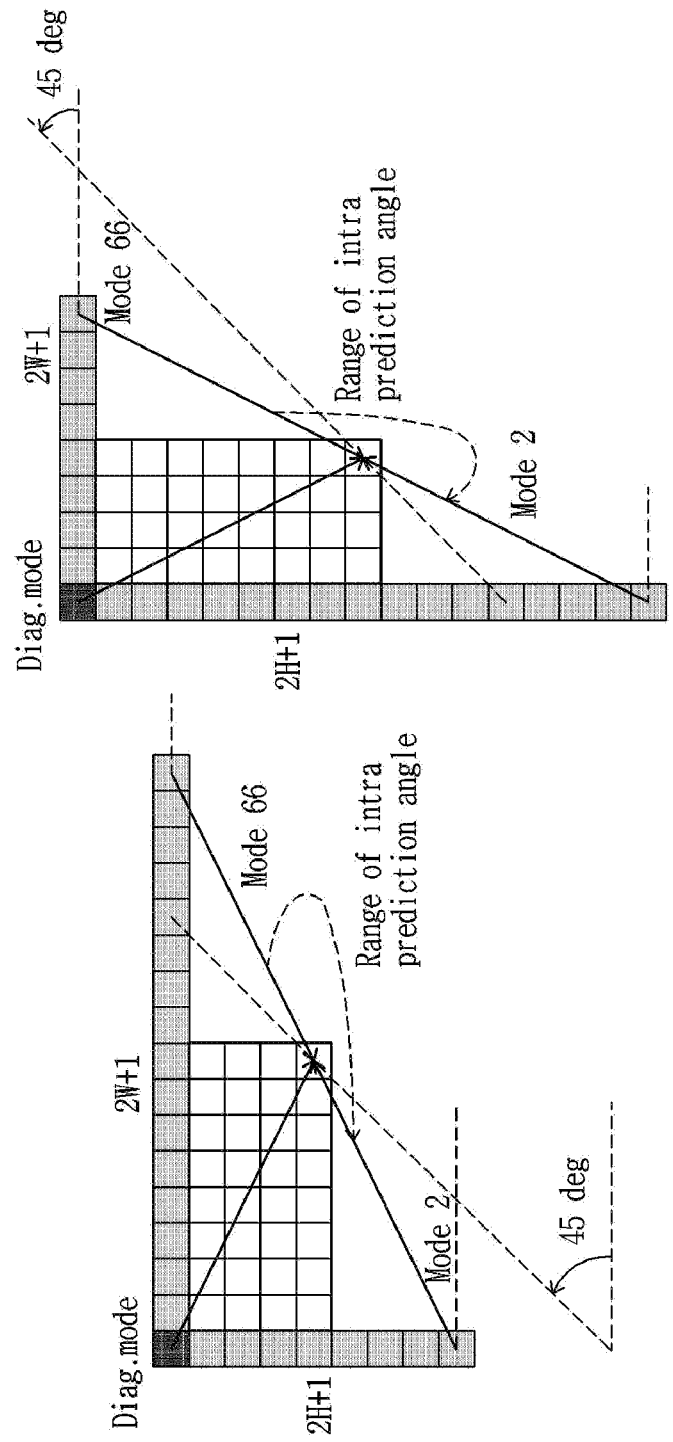

When an wide-angle intra prediction mode is used, a length of a top intra reference sample may be set as (2W+1) and a length of a left intra reference sample may be set as (2H+1) as in FIG. 20. When wide-angle intra prediction is used, the number of intra prediction modes increases when an intra prediction mode of an wide-angle intra prediction mode is encoded, so encoding efficiency may be reduced. An wide-angle intra prediction mode may be encoded by being replaced with the existing intra prediction mode which is not used in wide-angle intra and a replaced prediction mode is referred to as an wide-angle replaced mode.

Figure 21:
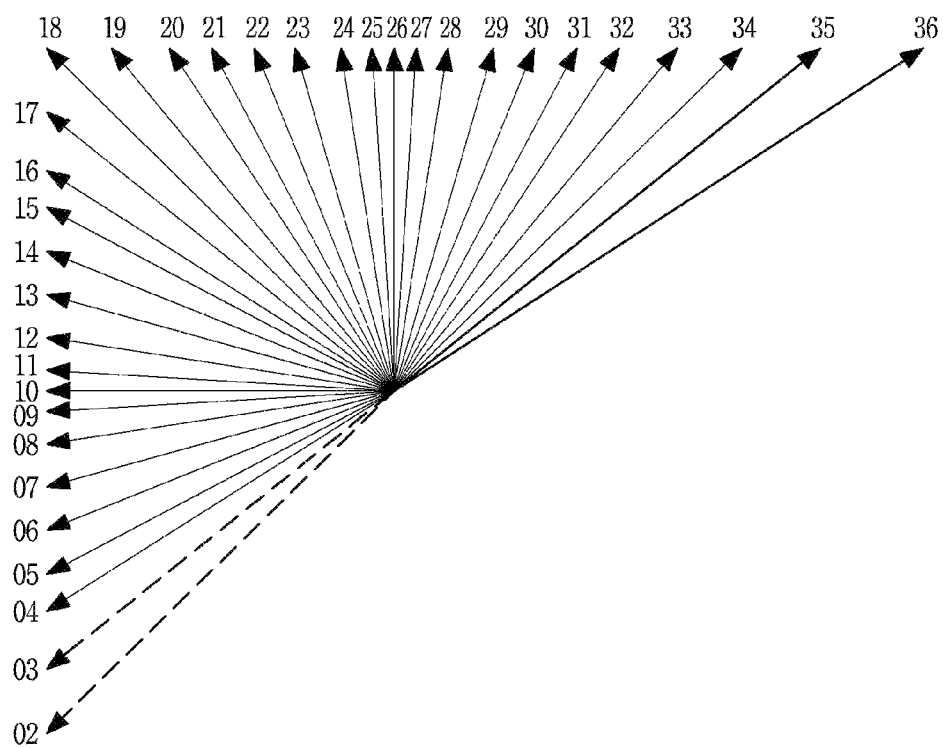

Concretely, for example, when 35 intra prediction modes are used as in FIG. 21, an wide-angle intra prediction mode 35 may be encoded into an intra prediction mode 2, an wide-angle replaced mode, and an wide-angle intra prediction mode 36 may be encoded into an intra prediction mode 3, an wide-angle replaced mode. A replaced mode and number may be differently set according to a shape of a coding block or a height and width ratio of a coding block. Concretely, for example, a replaced mode and number may be differently set according to a shape of a coding block as in Table 12 to Table 13. Table 12 represents a case in which 35 intra prediction modes are used and Table 13 represents a case in which 67 intra prediction modes are used.

TABLE 12

| Condition | Replaced Intra Prediction Modes |
|---|---|
| W/H = 2 | Modes 2, 3, 4 |
| W/H > 2 | Modes 2, 3, 4, 5, 6 |
| W/H = 1 | None |
| H/W = ½ | Modes 32, 33, 34 |
| H/W < ½ | Modes 30, 31, 32, 33, 34 |

TABLE 13

| Condition | Replaced Intra Prediction Modes |
|---|---|
| W/H = 2 | Modes 2, 3, 4, 5, 6, 7 |
| W/H > 2 | Modes 2, 3, 4, 5, 6, 7, 8, 9, 10, 11 |
| W/H = 1 | None |
| H/W = ½ | Modes 61, 62, 63, 64, 65, 66 |
| H/W < ½ | Modes 57, 58, 59, 60, 61, 62, 63, 64, 65, 66 |

Alternatively, a replaced mode and number may be differently set according to a shape of a coding block or a height and width ratio of a coding block. Concretely, for example, a replaced mode and number may be differently set according to a shape of a coding block as in Table 14. Table 14 represents a replaced intra prediction mode used according to a width and height ratio of a coding block.

TABLE 14

| Aspect ratio | Replaced intra prediction modes |
|---|---|
| W/H == 16 | Modes 12, 13, 14, 15 |
| W/H == 8 | Modes 12, 13 |
| W/H == 4 | Modes 2, 3, 4, 5, 6, 7, 8, 9, 10, 11 |
| W/H == 2 | Modes 2, 3, 4, 5, 6, 7, |
| W/H == 1 | None |
| W/H == ½ | Modes 61, 62, 63, 64, 65, 66 |
| W/H == ¼ | Mode 57, 58, 59, 60, 61, 62, 63, 64, 65, 66 |
| W/H == ⅛ | Modes 55, 56 |
| W/H == 1/16 | Modes 53, 54, 55, 56 |

Figure 22:
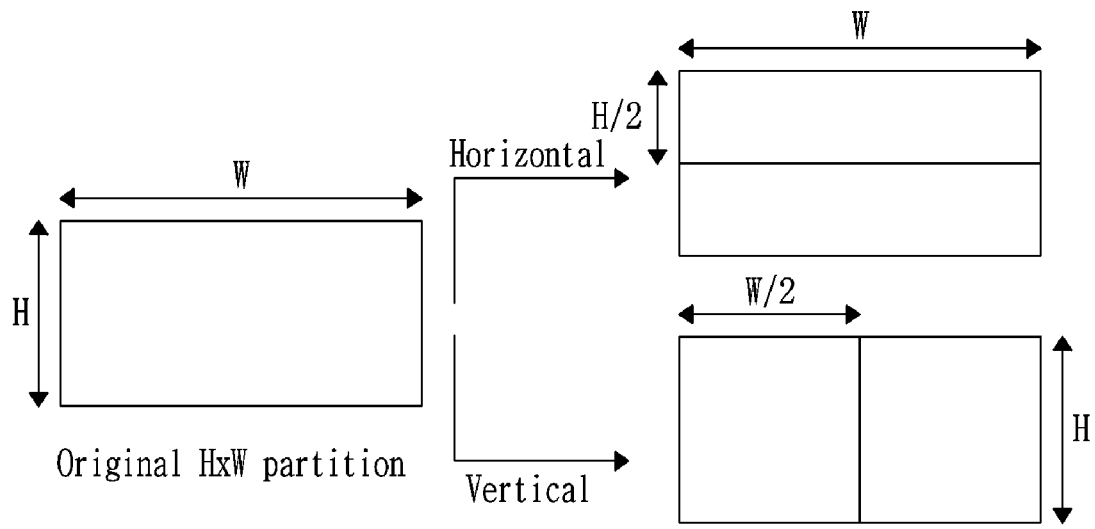
FIG. 22 shows a subpartition-based intra prediction method as an embodiment to which the present disclosure is applied.
Figure 22:
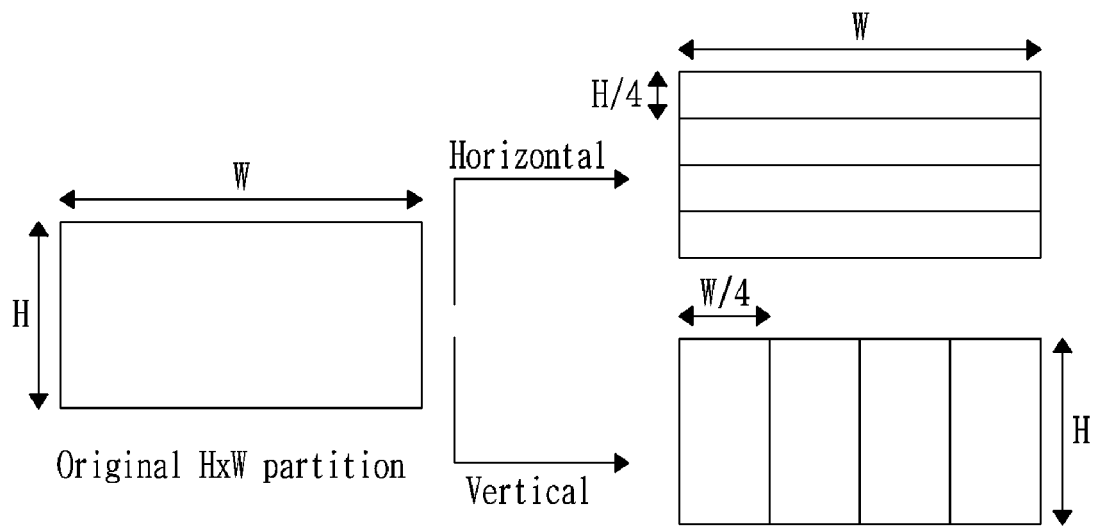

FIG. 22 shows a subpartition-based intra prediction method as an embodiment to which the present disclosure is applied.

In reference to FIG. 22, a coding block may be partitioned into a plurality of sub-blocks and a sub-block may be sequentially predicted/reconstructed based on a predetermined priority, which is referred to as a subpartition-based intra prediction method. A current sub-block may be predicted by referring to a sample of a pre-reconstructed sub-block in a coding unit. In this case, a sample of a reconstructed sub-block may be a sample to which an in-loop filter is not applied. The priority may be any one of the right from the left or the bottom from the top. But, it is not limited thereto and may be determined the left from the right or the top from the bottom. Hereinafter, a coding unit may mean a current block.

In a subpartition-based intra prediction method, there may be a limit that all sub-blocks in a coding unit use the same intra prediction mode.

Alternatively, in a subpartition-based intra prediction method, an intra prediction mode of at least one of sub-blocks in a coding unit may be different from other sub-blocks. In an example, an intra prediction mode of the N-th sub-block may be derived by adding/subtracting an offset to/from an intra prediction mode of the (n−1)-th sub-block. An offset may be predefined in an encoder/a decoder or may be derived according to a shape or a size of a coding unit, an intra prediction mode of a coding unit, or a shape or a size of a subpartition. Alternatively, information for determining an offset may be signaled in a bitstream.

Alternatively, part of a plurality of sub-blocks may use a directional mode and the rest may use a non-directional mode. Alternatively, any one of a plurality of sub-blocks may use a predefined default mode and the other may use a non-default mode. In this case, only when a directional mode of a first sub-block is a predefined intra prediction mode, a non-directional mode may be used in a second sub-block.

Alternatively, in a subpartition-based intra prediction method, an intra prediction mode of sub-blocks in a coding unit may be selected among predefined candidates. In this case, a predefined candidate may include at least one of a horizontal mode, a vertical mode, a diagonal mode (e.g., a top-left, top-right, bottom-left intra prediction mode) or a non-directional mode.

Alternatively, in a subpartition-based intra prediction method, an intra prediction mode of sub-blocks in a coding unit may be derived only from MPM candidates.

Alternatively, according to an intra prediction mode of a coding unit, using a subpartition-based intra prediction method may be limited. For example, when an intra prediction mode of a coding unit is a non-directional mode (e.g., a Planar or DC mode) or a predefined directional mode (e.g., a horizontal, vertical or diagonal mode), a subpartition-based intra prediction method may be set not to be used. Alternatively, when an intra prediction mode of a coding unit is an intra prediction mode which may not utilize a neighboring sub-block as a reference sample (e.g., a diagonal mode or an wide-angle intra prediction mode), a sub-partition-based intra prediction method may be set not to be used.

Alternatively, according to a size or a shape of a coding unit, using a subpartition-based intra prediction method may be restricted. For example, when a height and width ratio of a coding unit is greater than or equal to a threshold value or when at least one of a width or a height of a current block is less than or equal to a threshold value, a subpartition-based intra prediction method may be set not to be used.

According to the number/position of intra reference lines of a coding unit, using a subpartition-based intra prediction method may be restricted. For example, only when a position of an intra reference line of a coding unit is an adjacent intra reference line, a subpartition-based intra prediction method may be used. Alternatively, only when the number of intra reference lines of a coding unit is 1, a subpartition-based intra prediction method may be used.

A different quantization parameter value may be used in a unit of each sub-block and a difference value between a quantization parameter value of a previous sub-block and a quantization parameter value of a current sub-block may be encoded. In other words, a quantization parameter of a current sub-block may be derived based on an encoded difference value and a quantization parameter of a previous sub-block.

A sub-block (partition) may be classified into a partition in a vertical direction and a partition in a horizontal direction. A partition in a vertical direction may be generated by partitioning a coding block by using at least one vertical line and a partition in a horizontal direction may be generated by partitioning a coding block by using at least one horizontal line. A coding unit may be partitioned by using only a vertical line or may be partitioned by using only a horizontal line. Alternatively, a coding unit may be partitioned by using both a vertical line and a horizontal line.

The number of sub-blocks may be determined according to a size/shape of a coding unit. In an example, it may not be partitioned into a subpartition in a 4×4 coding unit, it may be partitioned into 2 subpartitions in a 8×4 to 4×8 coding unit and it may be partitioned into 4 partitions in other coding unit.

Alternatively, information representing the number, a size or a shape of a sub-block may be signaled in a bitstream. A size or a shape of a sub-block may be determined according to the number of partitions determined by information to be signaled or the number of sub-blocks may be determined according to a size/shape of a sub-block determined by information to be signaled.

In reference to FIG. 22, a coding unit may be classified into a partition in a vertical direction or a partition in a horizontal direction. intra_subpartitions_mode_flag, a flag representing whether a subpartition-based intra prediction method will be used in a coding block, may be signaled in a bitstream.

An intra partition type flag representing whether of being partitioned into a partition in a vertical direction or a partition in a horizontal direction (intra_subpartitions_split_flag) may be transmitted in a bitstream. When a value of intra_subpartitions_split_flag is 1, it represents that it may be partitioned into a partition in a horizontal direction to configure a subpartition and when a value of intra_subpartitions_split_flag is 0, it represents that it may be partitioned into a partition in a vertical direction to configure a subpartition.

Figure 23:
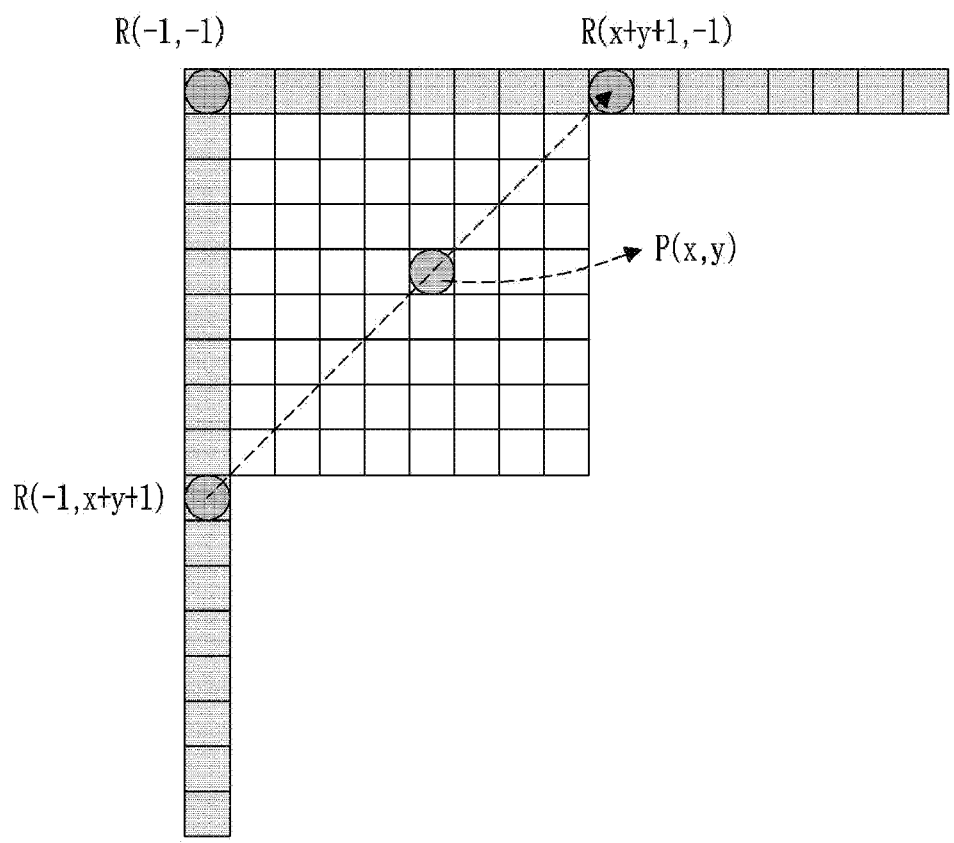
FIGS. 23 to 24 relate to a method in which a prediction value according to intra prediction is modified as an embodiment to which the present disclosure is applied.
Figure 24:
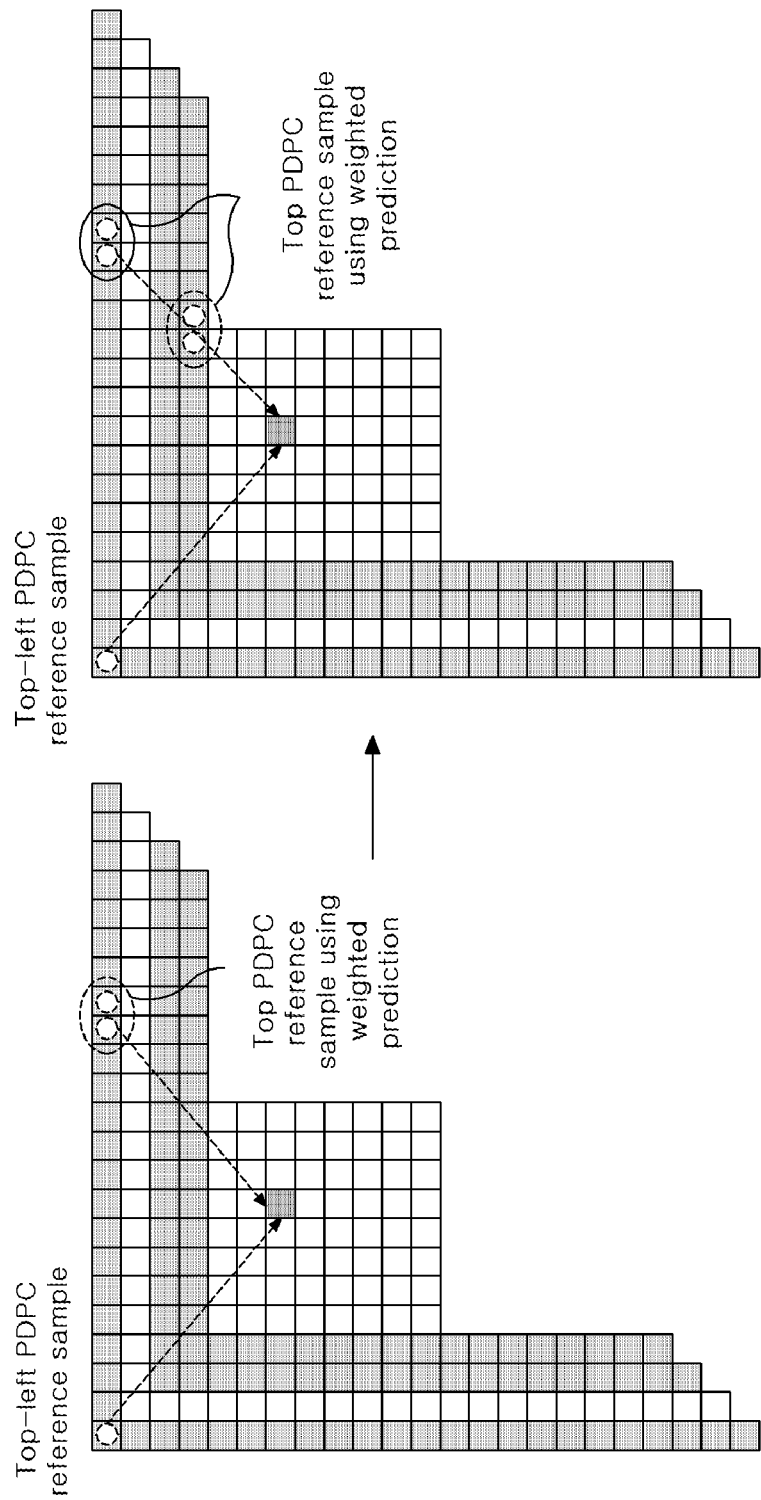

FIGS. 23 to 24 relate to a method in which a prediction value according to intra prediction is modified as an embodiment to which the present disclosure is applied.

Modification of a prediction value according to the present disclosure may be performed based on a predetermined reference sample and a weight. In this case, a reference sample and a weight may be determined based on a position of a sample in a current block targeted for modification (hereinafter, referred to as a current sample). In addition, a position of a reference sample may be determined based on an intra prediction mode of a current block.

After generating an intra prediction image, an intra prediction image may be modified per pixel based on a position of a pixel, which is defined as an intra weight prediction method based on a position of a pixel (Position dependent prediction combination, PDPC).

Embodiment 1

In reference to FIG. 23, a final intra prediction image may be generated by using weighted prediction of a current sample and one or a plurality of surrounding samples (a sample within an intra reference line). A weight per sample used for weighted prediction may be set as a value proportional to a position of a sample and a width of a coding unit and/or a height of a coding unit. But, FIG. 23 is just an example of a reference sample for PDPC and does not limit a position and/or the number of reference samples. For example, a position and/or the number of reference samples for PDPC may be differently determined according to an intra prediction mode of a current block.

PDPC may be used in multi-line intra prediction. PDPC_ref_idx for specifying a PDPC reference sample may be defined as in Table 15 according to a value of intra_luma_ref_idx, an intra reference line index.

TABLE 15

| PDPC_ref_idx | |
|---|---|
| 0 | 0 |
| 1 | 1 |
| 2 | 3 |

Concretely, for example, PDPC may generate a final intra prediction image as in the following Equation 4.

pred[x][y]=(wL[x]×refL[x][y]+wT×refT[x][y]−wTL[x][y]×refTL[x][y]+(64−wL−wT+wTL)×pred[x][y]+32)>>6  [Equation 4]

A reference sample used for weighted prediction in encoding PDPC is referred to as a PDPC reference sample. A PDPC reference sample on a top intra reference line is referred to as a top PDPC reference sample (refT), a reference sample on a left intra reference line is referred to as a left PDPC reference sample (refL) and a reference sample at a top-left position (e.g., R(−1,−1) or R(−2,−2) or R(−4,−4)) is referred to as a top-left PDPC reference sample.

A position of refT, a top PDPC reference sample, may be set as R(x+y+1, −1) or R(x, −1). Alternatively, a position of a left PDPC reference sample may be differently set according to a shape of a coding unit or an intra prediction mode value and may be derived by using weighted prediction from a plurality of samples.

Concretely, for example, when an intra prediction mode is any one of a DC mode, a planar mode, a horizontal mode (a mode value 18) or a vertical mode (a mode value 50), a top PDPC reference sample refT[x][y] may be derived as in the following Equation 5.

refT[x][y]=p[x][−1−PDPC_ref_idx]  [Equation 5]

When an intra prediction mode is INTRA_2 or INTRA_66, a top PDPC reference sample refT[x][y] may be derived as in the following Equation 6.

refT[x][y]=p[x+y+1][−1−PDPC_ref_idx]  [Equation 6]

Atop PDPC reference sample may be derived as in the following Equation 7 in a Top-right diagonal mode (a prediction mode that an intra prediction mode value is greater than 2 and smaller than 10 in 67 intra or wide-angle intra prediction modes).

refT[x][y] = (dX[x][y] < refW − 1)?

((64 − dXFrac[y]) ∗ p[dX[x][y]][−1 − PDPC_ref_idx] + dXFrac[y] ∗ p[dX[x][y] + 1][−1 − PDPC_ref_idx] +

32) ≫ 6:0  [Equation 7]

In Equation 7, refW represents a width of a reference sample reference.

In Equation 7, dX[x][y] is a parameter specifying a position of an intra reference sample according to an angle of an intra prediction mode and may be derived as in the following Equation 8, which is referred to as a parameter at a top position of an intra reference sample.

dXPos[y]=((y+1)*invAngle+2)>>2 dXFrac[y]=dXPos[y] & 63 dXnt[y]=dXPos[y]>>6 dX[x][y]=x+dXInt[y]  [Equation 8]

A top PDPC reference sample may be derived as in the following Equation 9 in a Bottom-left diagonal mode (a prediction mode that an intra prediction mode value is greater than 58 and smaller than 66 in 67 intra or wide-angle intra prediction modes).

refT[x][y]=0  [Equation 9]

A position of a left PDPC reference sample may be set as R(−1−PDPC_ref_idx, x+y+1)(p[−1−PDPC_ref_idx][x+y+1]) or may be set as R(−1−PDPC_ref_idx, x)(p[−1−PDPC_ref_idx][x]). Alternatively, a position of a top PDPC reference sample may be differently set according to a shape of a coding unit or an intra prediction mode value and may be derived by using weighted prediction from a plurality of samples.

Concretely, for example, when an intra prediction mode is any one of a DC mode, a planar mode, a horizontal intra prediction mode (an intra prediction mode value 18) or a vertical intra prediction mode (an intra prediction mode value 50), a left PDPC reference sample refL[x][y] may be derived as in the following Equation 10.

refL[x][y]=p[−1−PDPC_ref_idx][y]  [Equation 10]

When an intra prediction mode is INTRA_2 or INTRA_66, a left PDPC reference sample refT[x][y] may be derived as in the following Equation 11.

refL[x][y]=p[−1−PDPC_ref_idx][x+y+1]  [Equation 11]

In a Top-right diagonal mode, a left PDPC reference sample may be derived as in the following Equation 12.

refT[x][y]=0  [Equation 12]

In a Bottom-left diagonal mode, a left PDPC reference sample may be derived as in the following Equation 13.

refL[x][y] = (dY[x][y] < refH − 1)?  [Equation 13]

((64 − dYFrac[x]) ∗ p[−1 − PDPC_ref_idx][dY[x][y]] + dYFrac[x] ∗ p[−1][dY[x][y] + 1] + 32) ≫ 6:0

In Equation 13, refH represents a height of a reference sample reference. In Equation 13, dY[x][y] is a parameter specifying a position of an intra reference sample according to an angle of an intra prediction mode and may be derived as in the following Equation 14, which is referred to as a parameter at a left position of an intra reference sample.

dYPos[x]=((x+1)*invAngle+2)>>2 dYFrac[x]=dYPos[x] & 63 dYInt[x]=dYPos[x]>>6 dY[x][y]=y+dYInt[x]  [Equation 14]

In the Equation 14, invAngle is a parameter derived from an intra prediction angle and may be derived as in Equation 15.

$$invAngle = \text{Round}\left(\frac{256 * 32}{intraPredAngle}\right)$$  [Equation 15]

intraPredAngle represents an intra prediction angle per prediction mode shown in Table 11.

When PDPC is performed by using a non-adjacent intra reference sample in a multi-line intra prediction mode, discontinuity between a current sample and an intra reference sample increases, so quality degradation may be generated. A non-adjacent intra reference sample and an adjacent reference sample/other non-adjacent intra reference sample selected to reduce quality degradation may be smoothed through weighted prediction.

For example, when a multi-line intra prediction mode is used, a left PDPC reference sample and a top PDPC reference sample may be derived by performing weighted prediction for a selected reference sample line and other reference sample line as in FIG. 24.

Concretely, for example, when using a non-adjacent reference sample of multi-line intra and being a Top-Right diagonal mode, refT[x][y] may be derived by using weighted prediction of a non-adjacent reference sample and an adjacent reference sample and a weighted prediction parameter w may be set as a value proportional or inversely proportional to a distance with a current block. Concretely, for example, refT[x][y] may be derived as in the following Equation 16.

$$refT[x][y] = (dY[x][y] < refH - 1)?$$
$$(w*((64 - dYFrac[x])*p[-1 - PDPC\_ref\_idx][dY[x][y]] +$$
$$dYFrac[x]*p[-1 - PDPC\_ref\_idx][dY[x][y] + 1]) +$$
$$(64 - w)*((64 - dYFrac[x])*p[-1][dY[x][y]] +$$
$$dYFrac[x]*p[-1][dY[x][y] + 1]) + 32) \gg 6:0$$

[Equation 16]

Concretely, for another example, when using a non-adjacent reference sample of multi-line intra and being a Bottom-left diagonal mode, refL[x][y] may be derived by using weighted prediction of a non-adjacent reference sample and an adjacent reference sample and a weighted prediction parameter w may be set as a value proportional or inversely proportional to a distance with a current block. Concretely, for example, refL[x][y] may be derived as in the following Equation 17.

$$refT[x][y] = (dY[x][y] < refH - 1)?$$
$$(w*((64 - dYFrac[x])*p[-1 - PDPC\_ref\_idx][dY[x][y]] +$$
$$dYFrac[x]*p[-1 - PDPC\_ref\_idx][dY[x][y] + 1]) +$$
$$(64 - w)*((64 - dYFrac[x]*p[-1][dY[x][y]] +$$
$$dYFrac[x]*p[-1][dY[x][y] +$$

[Equation 17]

For another example, when using a non-adjacent reference sample of multi-line intra and being a horizontal prediction mode (INTRA_18), refL[x][y] may be derived by using weighted prediction of a non-adjacent reference sample and an adjacent reference sample or a value scaling a difference between a top-left PDPC sample and a left PDPC sample may be added.

Concretely, for example, refL[x][y] may be derived as in the following Equation 18.

$$refL[x][y]=(w*p[-1-PDPC\_ref\_idx][y]+(4-w)*(p[-1-PDPC\_ref\_idx]-p[-1][y]+2) \gg 2$$

$$refL[x][y]=p[-1-PDPC\_ref\_idx][y]+(p[-1-PDPC\_ref\_idx][y]-[-1PDPC\_ref\_idx][-1PDPC\_ref\_idx]) \gg 1$$

[Equation 18]

For another example, when using a non-adjacent reference sample of multi-line intra and being a vertical prediction mode (INTRA_50), refT[x][y] may be derived by using weighted prediction of a non-adjacent reference sample and an adjacent reference sample or a value scaling a difference between a top-left PDPC sample and a top PDPC sample may be added.

Concretely, for example, refL[x][y] may be derived as in the following Equation 19.

$$refT[x][y]=(w*p[x][-1-PDPC\_ref\_idx]+(4-w)*(p[x][-1-PDPC\_ref\_idx]-p[x][-1]$$

$$refT[x][y]=p[x][-1-PDPC\_ref\_idx][y]+(p[x][-1-PDPC\_ref\_idx]-p[-1-PDPC\_ref\_idx][-1-PDPC\_ref\_idx])$$

[Equation 19]

wL, wT, wTL and (64−wL−wT+wTL), a sample unit weight of PDPC weighted prediction (hereinafter, a PDPC sample unit weight), may be derived based on an intra prediction mode. For example, it may be derived as a value proportional or inversely proportional to a x-axis coordinate value and/or a y-axis coordinate value and/or a width/a height of a coding block.

wL is referred to as a left PDPC weight, wT is referred to as a top PDPC weight, wTL is referred to as a top-left PDPC weight and (64−wL−wT+wTL) is referred to as a current sample PDPC weight.

Concretely, for example, when it is any one of a DC mode, a planar mode, a horizontal intra prediction mode (an intra prediction mode value 18) or a vertical intra prediction mode (an intra prediction mode value 50), it may be derived as in the following Equation 20.

$$wT[y]=32 \gg ((y \ll 1) \gg shift$$

$$wL[x]=32 \gg ((x \ll 1) \gg shift$$

[Equation 20]

$$wTL[x][y]=(predModeIntra==INTRA\_DC)?((wL[x] \gg 4)+(wT[y] \gg 4)):0$$

In this case, a shift value may be defined as in the following Equation 21.

$$shift=(\log 2(width)-2+\log 2(height)-2+2) \gg 2$$  [Equation 21]

When an intra prediction mode is INTRA_2 or INTRA_66, a PDPC sample unit weight may be derived as in the following Equation 22.

$$wT[y]=(16 \gg ((y \ll 1) \gg shift))$$

$$wL[x]=(16 \gg ((y \ll 1) \gg shift))$$

$$wTL[x][y]=0$$  [Equation 22]

A PDPC sample unit weight may be derived as in the following Equation 23 in a Top-right diagonal mode (a prediction mode that an intra prediction mode is smaller than 10 in 67 intra or wide-angle intra prediction modes).

$$wT[y]=(dX[x][y]<refW-1)?(32 \gg ((y \ll 1) \gg shift)):0$$

$$wL[x]=0$$

$$wTL[x][y]=0$$  [Equation 23]

A PDPC sample unit weight may be derived as in the following Equation 24 in a Bottom-left diagonal mode (a prediction mode that an intra prediction mode is greater than 58 and smaller than 67 in 67 intra or wide-angle intra prediction modes).

$$wT[y]=0$$

$$wL[x]=(dY[x][y]<\text{refH}-1)?(32>>((x<<1)>>\text{shift}))$$

$$wTL[x][y]=0 \qquad \text{[Equation 24]}$$

Embodiment 2

When an intra prediction mode of a current block is a non-directional mode, a reference pixel of a current sample (refL, refT) may belong to a first pixel line adjacent to a current block and may be positioned on the same horizontal/vertical line as a current sample. A weight may include at least one of a first weight (wL) in a x-axis direction, a second weight (wT) in a y-axis direction or a third weight (wTL) in a diagonal direction. A first weight may mean a weight applied to a left reference pixel, a second weight may mean a weight applied to a top reference pixel and a third weight may mean a weight applied to a top-left reference pixel, respectively. In this case, a first and second weight may be determined based on position information of a current sample and a predetermined scaling factor (nScale). A scaling factor may be determined based on a width (W) and a height (H) of a current block. For example, a first weight (wL[x]) of a current sample (predSample[x][y]) may be determined as (32>>((x<<1)>>nScale)) and a second weight (wT[x]) may be determined as (32>>((y<<1)>>nScale)). A third weight (wTL[x][y]) may be determined as ((wL[x]>>4)+(wT[y]>>4)). But, when an intra prediction mode is a Planar mode, a third weight may be determined to be 0. The scaling factor may be set as ((Log 2(nTbW)+Log 2(nTbH)−2)>>2).

When an intra prediction mode of a current block is a vertical/horizontal mode, a reference pixel of a current sample (refL, refT) may belong to a first pixel line adjacent to a current block and may be positioned on the same horizontal/vertical line as a current sample. For a vertical mode, a first weight (wL[x]) of a current sample (predSample[x][y]) may be determined as (32>>((x<<1)>>nScale)), a second weight (wT[y]) may be determined as 0 and a third weight (wTL[x][y]) may be determined the same as a first weight. On the other hand, for a horizontal mode, a first weight (wL[x]) of a current sample (predSample [x][y]) may be determined as 0, a second weight (wT[y]) may be determined as (32>>((y<<1)>>nScale)) and a third weight (wTL[x][y]) may be determined the same as a second weight.

When an intra prediction mode of a current block is a diagonal mode, a reference pixel of a current sample (refL, refT) may belong to a first pixel line adjacent to a current block and may be positioned on the same diagonal line as a current sample. In this case, a diagonal line has the same angle as an intra prediction mode of a current block. The diagonal line may mean a diagonal line in a top-right direction at a bottom-left position or may mean a diagonal line in a bottom-right direction at a top-left position. In this case, a first weight (wL[x]) of a current sample (predSample [x][y]) may be determined as (32>>((x<<1)>>nScale)), a second weight (wT[y]) may be determined as (32>> ((y<<1)>>nScale)) and a third weight (wTL[x][y]) may be determined as 0.

Alternatively, when an intra prediction mode of a current block is smaller than No. 18 mode, a reference sample of a current sample (refL, refT) may belong to an adjacent intra reference line of a current block. The reference sample may be positioned on the same diagonal line as a current sample or may be adjacent to a diagonal line.

For example, when the diagonal line passes an integer-pel in an adjacent intra reference line, the reference sample may be determined as an integer-pel on a diagonal line. On the other hand, when the diagonal line passes between 2 integer-pels belonging to an adjacent intra reference line, the reference sample may be determined as 1 fractional-pel generated by interpolating 2 integer-pels. Alternatively, without a separate interpolation process, an integer-pel closest to a diagonal line among 2 integer-pels may be determined as a reference sample or an interger-pel in a specific direction may be determined as a reference sample based on a diagonal line. In this case, a specific direction may mean any one of the left or the right, or may mean any one of the top or the bottom. The diagonal line may be determined according to an angle of an intra prediction mode of a current block.

But, for a reference sample, there may be a limit that only any one of a left or top reference sample of a current block is used. A first weight (wL[x]) of a current sample (predSample [x][y]) may be determined as 0, a second weight (wT[y]) may be determined as (32>>((y<<1)>>nScale)) and a third weight (wTL[x][y]) may be determined as 0.

When an intra prediction mode of a current block is greater than No. 50 mode, a reference pixel of a current sample (refL, refT) may belong to an adjacent intra reference line of a current block. The reference sample may be positioned on the same diagonal line as a current sample or may be adjacent to a diagonal line.

For example, when the diagonal line passes an integer-pel in an adjacent intra reference line, the reference sample may be determined as an integer-pel on a diagonal line. On the other hand, when the diagonal line passes between 2 integer-pels belonging to an adjacent intra reference line, the reference sample may be determined as 1 fractional-pel generated by interpolating 2 integer-pels. Alternatively, without a separate interpolation process, an integer-pel closest to a diagonal line among 2 integer-pels may be determined as a reference sample or an interger-pel in a specific direction may be determined as a reference sample based on a diagonal line. In this case, a specific direction may mean any one of the left or the right, or may mean any one of the top or the bottom. The diagonal line may be determined according to an angle of an intra prediction mode of a current block.

But, for a reference sample, there may be a limit that only any one of a left or top reference pixel of a current block is used. A first weight (wL[x]) of a current sample (predSample [x][y]) may be determined as (32>>((x<<1)>>nScale)), a second weight (wT[y]) may be determined as 0 and a third weight (wTL[x][y]) may be determined as 0.

Based on the determined reference pixel(refL[x][y], refT [x][y]) and weight (wL[x], wT[y], wTL[x][y]), a current sample (predSamples[x][y]) may be modified as in the above-described Equation 4.

But, the above-described modification process may be performed only when a current block does not perform intra prediction in a unit of a sub-block. The modification process may be performed only when a reference pixel of a current block is a first pixel line. The modification process may be performed only when an intra prediction mode of a current block corresponds to a specific mode. In this case, a specific mode may include at least one of a non-directional mode, a vertical mode, a horizontal mode, a mode smaller than a predetermined first threshold mode or a mode greater than a predetermined second threshold mode. The first threshold mode may be No. 8, 9, 10, 11 or 12 mode or a horizontal mode or No. 66 diagonal mode, or the second threshold mode may be No. 56, 57, 58, 59, or 60 mode, or a vertical mode or No. 2 diagonal mode.

Figure 26:
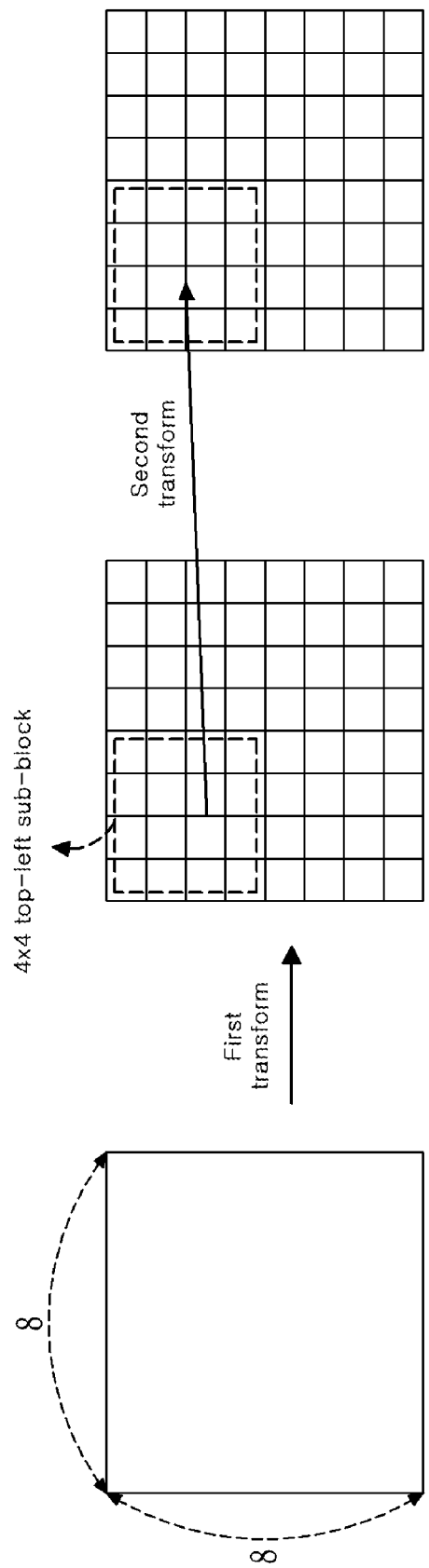
Figure 27:
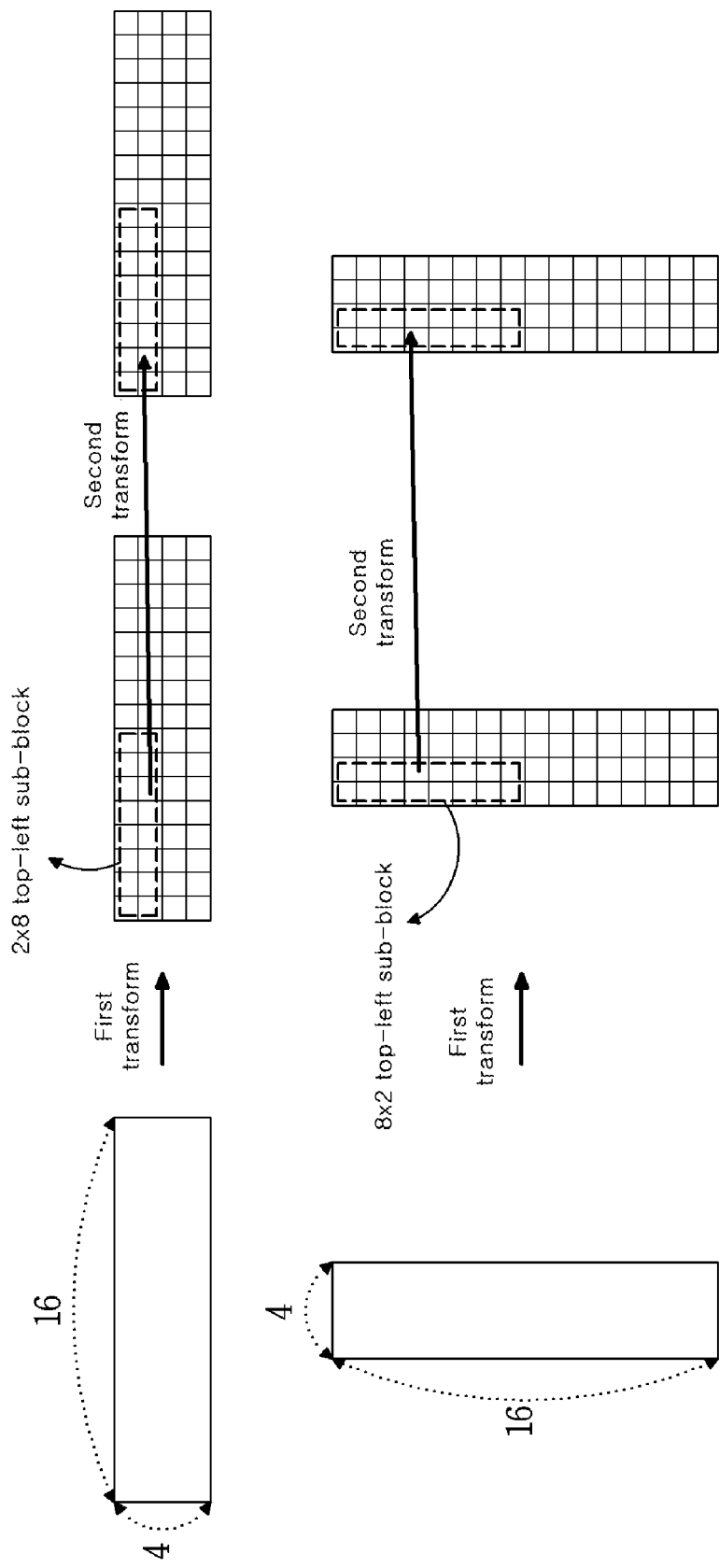

FIGS. 25 to 27 show a method in which a residual image is encoded/decoded based on transform and/or quantization as an embodiment to which the present disclosure is applied.

An image subtracting a prediction image from an original image is referred to as a residual image.

A residual image may be decomposed into a two-dimensional frequency component through two-dimensional transform such as DCT (Discrete cosine transform). There is a feature that visual distortion is not generated significantly although a high-frequency component is removed from an image. When a value corresponding to high frequency is set to be small or 0, compression efficiency may be improved without significant visual distortion.

DST (Discrete sine transform) may be used according to a size of a prediction block or a prediction mode. Concretely, for example, when it is an intra prediction mode and a size of a prediction block/a coding block is smaller than N×N, it may be set to use DST transform and for other prediction block/coding block, it may be set to use DCT.

DCT is a process in which an image is decomposed (transformed) into two-dimensional frequency components by using cos transform and frequency components in this case are represented as a base image. For example, when DCT transform is performed in a N×N block, $N^2$ basic pattern components may be obtained. Performing DCT transform means that a size of each basic pattern component included in an original pixel block is found. A size of each basic pattern component is referred to as a DCT coefficient.

Generally, in an image where many non-zero components are distributed at low frequencies, DCT (Discrete Cosine Transform) is mainly used, and in an image where many high frequency components are distributed, DST (Discrete Sine Transform) may be used.

DST represents a process in which an image is decomposed (transformed) into two-dimensional frequency components by using sin transform. A two-dimensional image may be decomposed (transformed) into two-dimensional frequency components by using a transform method excluding DCT or DST transform, which is referred to as two-dimensional image transform.

Two-dimensional image transform may not be performed in a specific block among residual amongs, which is referred to as a transform skip. After a transform skip, quantization may be applied.

DCT or DST or two-dimensional image transform may be applied to an arbitrary block in a two-dimensional image, and transform used in this case is defined as first transform. Transform may be performed again in some regions of a transform block after first transform is performed, which is defined as second transform.

First transform may use one of a plurality of transform cores. Concretely, for example, any one of DCT2, DCT8 or DST7 may be selected and used in a transform block or a different transform core may be used in transform in a horizontal direction and transform in a vertical direction in a transform block, which is referred to as a multiple transform selection method (Multiple Transform Selection, MTS). In this case, DCT2, DCT8 or DST7 is referred to as a transform core.

In an example, cu_mts_flag selecting whether DCT2 will be used as a transform core in a horizontal direction and in a vertical direction may be signaled in a coding block.

When a value of cu_mts_flag is 1, it represents that DCT2 is used as a transform core in a horizontal direction and in a vertical direction.

When a value of cu_mts_flag is 0, it represents that DCT8 or DST7 is used as a transform core in a horizontal direction and in a vertical direction.

Only when a value of cu_mts_flag is 0, a transform core index (mts_idx) may be signaled.

For a coding unit in a vertical direction or a coding unit in a horizontal direction, a value of cu_mts_flag may be set to be 0.

TABLE 16

| mts_idx | INTRA | | INTER | |
|---|---|---|---|---|
| | Transform Core in a horizontal direction | Transform Core in a vertical direction | Transform Core in a horizontal direction | Transform Core in a vertical direction |
| 0 | DST7 | DST7 | DCT8 | DCT8 |
| 1 | DCT8 | DST7 | DST7 | DCT8 |
| 2 | DST7 | DCT8 | DCT8 | DST7 |
| 3 | DCT8 | DCT8 | DST7 | DST7 |

When it is an intra coding unit and the number of non-zero transform coefficients is smaller than or the same as a threshold value, a transform core index may not be signaled and DST7 may be used as a transform core in a horizontal direction and a transform core in a vertical direction. A threshold value used in this case is referred to as a first transform selection threshold value. In an example, a first transform selection threshold value may be set to be 2 or may be set to be a value proportional to a size of a coding unit.

Concretely, for example, a first transform selection threshold value may be set to be 2 in a coding unit smaller than or the same as 32×32 and a first transform selection threshold value may be set to be 4 in a coding unit greater than 32×32 (e.g., a 32×64, 64×32 or 64×64 sized coding unit)

Alternatively, a different transform core may be used according to a shape of a coding unit. In an example, a transform core in a horizontal direction and a transform core in a vertical direction may be set not the same in a coding unit in a horizontal direction or in a coding unit in a vertical direction. In other words, a transform core index may be set to have only a value of 1 to 2 and a transform core flag (mts_flag) may be signaled as in Table 16.

When a transform core flag value is 0, a transform core index may be set to be 1 and when a transform core flag value is 1, a transform core index may be set to be 2.

TABLE 17

| | Descriptor |
|---|---|
| residual_coding( x0, y0, log2TbWidth, log2TbHeight, cIdx ) { <br> ... <br> if( cu_mts_flag[ x0 ][ y0 ] && ( cIdx = = 0 ) <br> &&!transform_skip_flag[ x0 ][ y0 ][ cIdx ] &&( ( CuPredMode[ x0 ][ y0 ] = <br> = MODE_INTRA && numSigCoeff > 2 ) | | ( CuPredMode[ x0 ][ y0 ] <br> = = MODE_INTER )) ) { <br> if (cbHeight == cbWidth) { <br> mts_idx[ x0 ][ y0 ] <br> } else { <br> mts_flag[ x0 ][ y0 ] <br> } <br> } | <br><br><br><br><br><br>ae(v)<br><br>u(1) |

Alternatively, a value of mts_idx may be rearranged (reordered) according to a shape of a coding unit.

In an example, when a coding unit is a coding unit in a vertical direction or a coding unit in a horizontal direction, mts_idx may be rearranged as in Table 17.

TABLE 18

| | INTRA | | INTER | |
|---|---|---|---|---|
| mts_idx | Transform Core in a horizontal direction | Transform Core in a vertical direction | Transform Core in a horizontal direction | Transform Core in a vertical direction |
| 0 | DCT8 | DST7 | DST7 | DCT8 |
| 1 | DST7 | DCT8 | DCT8 | DST7 |
| 2 | DST7 | DST7 | DST7 | DST7 |
| 3 | DCT8 | DCT8 | DST7 | DST7 |

In reference to FIG. 25, when it is an intra coding unit and the maximum number of non-zero coefficients in a horizontal direction is smaller than 2, DST7 may be used as a transform core in a horizontal direction. In this case, the maximum number of non-zero coefficients in a horizontal direction represents the number of non-zero coefficients in a 1×N sub-block in a coding unit.

When it is an intra coding unit and the maximum number of non-zero coefficients in a vertical direction is smaller than 2, DST7 may be used as a transform core in a vertical direction. In this case, the maximum number of non-zero coefficients in a horizontal direction represents the number of non-zero coefficients in a N×1 sub-block in a coding unit.

Whether second transform is performed may be selectively determined based on whether a transform core in a horizontal direction is the same as a transform core in a vertical direction. In an example, it may be set to perform second transform only when a transform core in a horizontal direction is the same as a transform core in a vertical direction. In another example, it may be set to perform second transform only when a transform core in a horizontal direction is different from a transform core in a vertical direction.

Alternatively, when it is an intra coding unit and the number of non-zero transform coefficients is smaller than a first transform selection threshold value, it may be set not to use second transform.

In another example, it may be set not to use second transform based on the number of non-zero transform coefficients in a coding unit.

When the number of non-zero transform coefficients is greater than N, it may be set to perform second transform and when the number of non-zero transform coefficients is smaller than or the same as N, it may be set not to perform second transform.

A unit of a block performing first transform and second transform may be differently set. Concretely, for example, after first transform is performed in a 8×8 block of a residual image, second transform may be performed respectively per 4×4 sub-block. In another example, after first transform is performed in each 4×4 block, second transform may be performed respectively in a 8×8 sized block.

A size and a shape of a sub-block which will perform second transform may be differently set based on a shape of a coding unit.

In an example, after first transform is performed in a square coding unit, second transform may be performed in all or only part of regions of a N×N sub-block at a top-left position. Concretely, for example, after first transform is performed in a 8×8 sized coding unit as in FIG. 26, second transform may be performed in a 4×4 top-left sub-block. Among coding units in a horizontal direction, a coding unit that a width of a coding unit more than quadruples a height of a coding unit is referred to as a coding unit in the maximum horizontal direction.

Among coding units in a vertical direction, a coding unit that a height of a coding unit more than quadruples a width of a coding unit is referred to as a coding unit in the maximum horizontal direction.

In another example, after first transform is performed in a coding unit in the maximum horizontal direction, second transform may be performed in all or only part of regions of a (kN)×(4 kN) sub-block at a top-left position.

Concretely, for example, after first transform is performed in a 16×4 coding unit in the maximum horizontal direction as in the top picture of FIG. 27, second transform may be performed in a 2×8 top-left sub-block.

After first transform is performed in a coding unit in the maximum vertical direction as in the bottom picture of FIG. 27, second transform may be performed only in a (4 kN)× (kN) sub-block at a top-left position.

A residual image to which first transform is applied is defined as a first transform residual image.

DCT or DST or two-dimensional image transform may be applied to a first transform residual image, and transform used in this case is defined as second transform. A two-dimensional image to which second transform is applied is defined as a second transform residual image.

A sample value in a block after performing first transform and/or second transform is defined as a transform coefficient. Quantization refers to a process in which a transform coefficient is divided by a predefined value to reduce energy of a block. A value defined to apply quantization to a transform coefficient is defined as a quantization parameter.

A predefined quantization parameter may be applied in a unit of a sequence or a block. Generally, a quantization parameter may be defined as a value from 1 to 51.

After performing transform and quantization, a residual reconstructed image may be generated by performing dequantization and inverse transform. A first reconstructed image may be generated by adding a prediction image to a residual reconstructed image.

A decoding device may reconstruct a residual image by inversely performing a transform and quantization process in the above-described encoding device. When the transform includes first transform and second transform, a decoding device may perform dequantization for a residual coefficient of a signaled transform block and may sequentially perform second transform and first transform for a transform block. In this case, second transform may be applied only to some regions in a transform block and some regions may mean a top-left, left or top sub-region.

Figure 28:
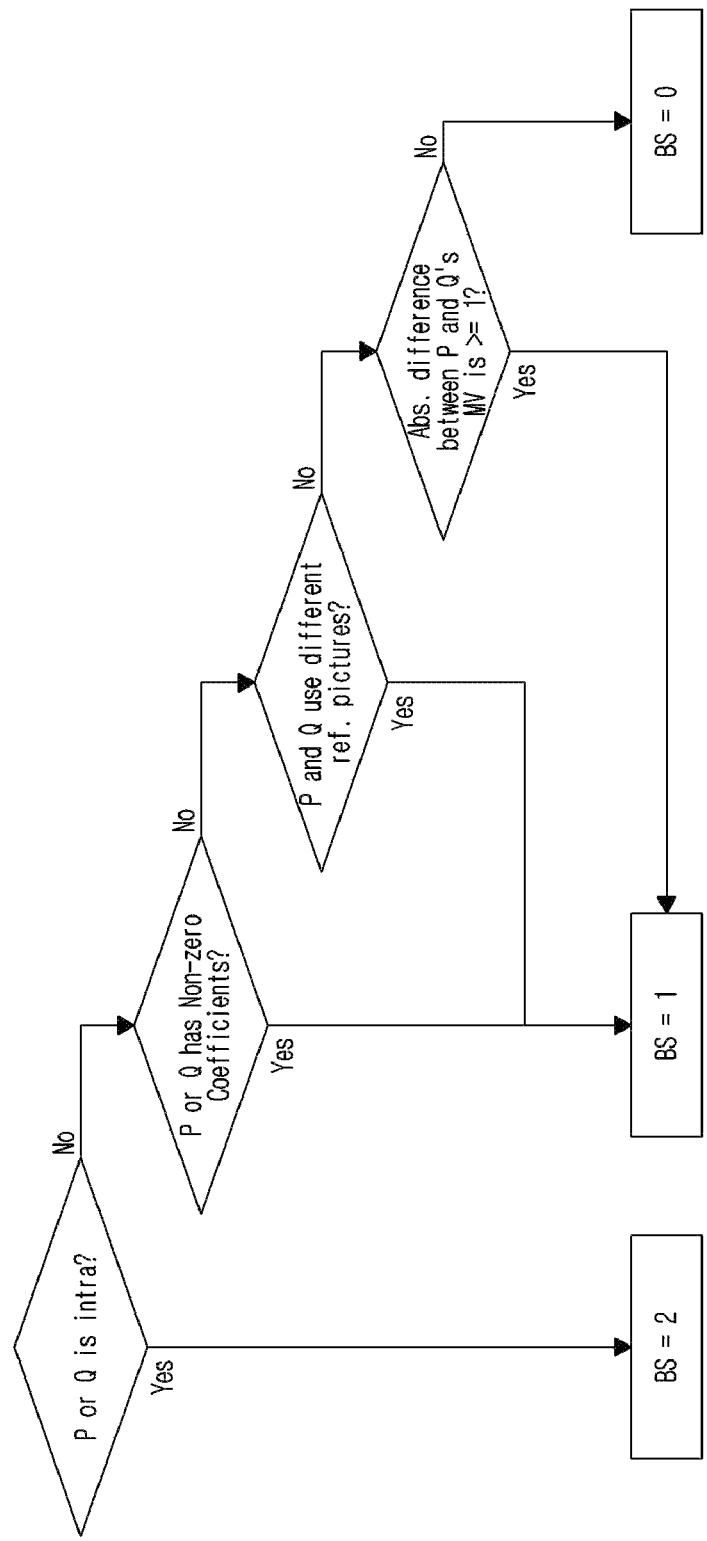
FIGS. 28 to 29 show a method in which an in-loop filter is applied to a reconstructed image as an embodiment to which the present disclosure is applied.
Figure 29:
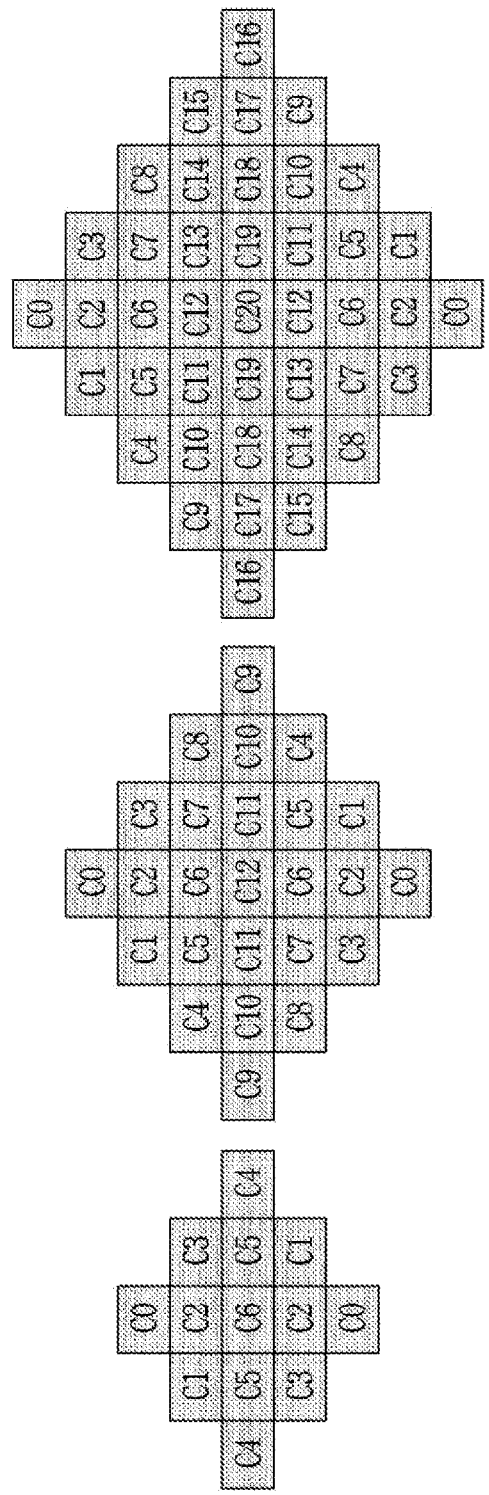

FIGS. 28 to 29 show a method in which an in-loop filter is applied to a reconstructed image as an embodiment to which the present disclosure is applied.

In-loop filtering is a technology which adaptively performs filtering for a decoded image to reduce loss of information generated in a quantization and encoding process. A deblocking filter, a sample adaptive offset filter (SAO) and an adaptive loop filter (ALF) are an example of in-loop filtering.

A second reconstructed image may be generated by performing at least any one of a deblocking filter, a sample adaptive offset filter (SAO) or an adaptive loop filter (ALF) for a first reconstructed image.

After applying a deblocking filter to a reconstructed image, SAO and ALF may be applied.

Transform and quantization are performed in a unit of a block in a video encoding process. Loss generated in a quantization process is generated and discontinuity is generated on a boundary of an image reconstructing it. A discontinuous image generated on a block boundary is defined as blocking artifact.

A deblocking filter is a method which alleviates blocking artifact generated on a block boundary of a first image and improves encoding performance.

Blocking artifact may be alleviated by performing filtering on a block boundary and a value of a blocking strength (hereinafter, BS) may be determined based on at least any one of whether a block is encoded by an intra prediction mode as in FIG. 28, or whether a difference of a motion vector absolute value of a neighboring block is greater than a predefined predetermined threshold value, or whether a reference picture of a neighboring block is the same each other. When a value of BS is 0, filtering may not be performed and when a value of BS is 1 or 2, filtering may be performed on a block boundary.

Because quantization is performed in a frequency domain, ringing artifact is generated on an edge of an object or a pixel value gets larger or smaller by a certain value compared to an original. SAO may effectively reduce ringing artifact by adding or subtracting a specific offset in a unit of a block by considering a pattern of a first reconstructed image. SAO is configured with an edge offset (hereinafter, EO) and a band offset (BO) according to a feature of a reconstructed image. An edge offset is a method which differently adds an offset to a current sample according to a surrounding pixel sample pattern. A band offset is to reduce an encoding error by adding a certain value to a pixel set with a similar pixel brightness value in a region. Pixel brightness may be divided into 32 uniform bands to set a pixel with a similar brightness value as one set. For example, 4 adjacent bands may be combined into one category. It may be set to use the same offset value in one category.

ALF (Adaptive Loop Filter) is a method which generates a second reconstructed image by using any one of predefined filters for a first reconstructed image or a reconstructed image that deblocking filter is performed for a first reconstructed image as in Equation 25.

$$R'(i, j) = \sum_{k=-N/2}^{N/2} \sum_{l=-/2}^{N/2} f(k, l) \times R(i+k, j+l)$$ [Equation 25]

In this case, a filter may be selected in a unit of a picture or in a unit of CTU.

For a luma component, any one of a 5×5, 7×7 or 9×9 diamond shape may be selected as in FIG. 29. For a chroma component, there may be a limit that only a 5×5 diamond shape is used.

A variety of embodiments of the present disclosure do not enumerate all possible combinations, but are to describe the representative aspect of the present disclosure and matters described in various embodiments may be independently applied or may be applied by two or more combinations.

In addition, a variety of embodiments of the present disclosure may be implemented by a hardware, a firmware, a software, or their combination, etc. For implementation by a hardware, implementation may be performed by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general processors, controllers, microcontrollers, microprocessors, etc.

A range of the present disclosure includes software or machine-executable instructions (e.g., an operating system, an application, a firmware, a program, etc.) which execute an action according to a method of various embodiments in a device or a computer and a non-transitory computer-readable medium that such software or instructions, etc. are stored and are executable in a device or a computer.

INDUSTRIAL APPLICABILITY

The present disclosure may be used for encoding/decoding a video signal.

What is claimed is:

1. A method of decoding an image, the method comprising:
   determining a current block by partitioning a coding block in the image based on a tree-based block division;
   determining an intra prediction mode of the current block based on a syntax element obtained from a bitstream; and
   performing intra prediction of the current block based on the intra prediction mode,
   wherein the syntax element comprises a flag indicating whether a pre-defined default mode is used for the intra prediction of the current block,
   wherein, in response to the flag indicating that the default mode is used for the intra prediction of the current block, the intra prediction mode is set to the default mode, wherein, in response to the flag indicating that the default mode is not used for the intra prediction of the current block, the intra prediction mode is derived from a candidate group including a plurality of most probable mode (MPM) candidates, wherein the default mode is representative of a Planar mode, and wherein, in response to a case where the current block is partitioned into a plurality of sub-blocks, the intra prediction is sequentially performed in units of the sub-blocks and the plurality of sub-blocks belonging to the current block uses the same intra prediction mode for the intra prediction.

2. The method of claim 1, wherein the default mode is not included in the candidate group.

3. The method of claim 2, wherein the plurality of MPM candidates comprises at least one of an intra prediction mode of a surrounding block (candIntraPredMode), candIntraPredMode−N, or candIntraPredMode+N, and wherein N is equal to 2.

4. The method of claim 2, wherein the plurality of MPM candidates comprises at least one of a DC mode, a vertical mode, a horizontal mode, (a vertical mode−M) or (a vertical mode+M), and wherein M is equal to 4.

5. The method of claim 1, wherein, in response to the intra prediction mode being a directional mode, the intra prediction mode is modified by adding or subtracting a predetermined offset, wherein the intra prediction is performed using the modified intra prediction mode, and wherein the modification of the intra prediction mode is selectively performed based on at least one of a size, a shape, partition information, a value of the intra prediction mode, or a component type of the current block.

6. The method of claim 1, wherein performing the intra prediction comprises:

partitioning the current block into the plurality of sub-blocks by using a vertical line or a horizontal line, wherein a number of the sub-blocks belonging to the current block is variably determined based on at least one of a size or a shape of the current block.

7. The method of claim 1, wherein performing the intra prediction comprising:

modifying a prediction value, generated by performing the intra prediction, based on a predetermined reference sample and a weight.

8. The method of claim 7, wherein each of the reference sample and the weight is determined based on at least one of a size of the current block, a position of a current sample to be modified, or the intra prediction mode of the current block.

9. The method of claim 1, wherein, in response to a case where the default mode is used for the intra prediction of the current block, an intra reference line for the current block for the intra prediction is restricted to be determined as only a reference line adjacent to the current block among a plurality of reference lines.

10. The method of claim 1, wherein the tree-based block division includes at least one of a binary-tree division or a ternary-tree division, and wherein the binary-tree division is a division type of horizontally or vertically dividing one coding block into two coding blocks and the ternary-tree division is a division type of horizontally or vertically dividing one coding block into three coding blocks.

11. A method of encoding an image, the method comprising:

determining a current block by partitioning a coding block in the image based on a tree-based block division;

determining an intra prediction mode of the current block; and performing intra prediction of the current block, wherein a prediction block of the current block is generated by performing the intra prediction based on the intra prediction mode, wherein a flag indicating whether a pre-defined default mode is used for the intra prediction of the current block is encoded into a bitstream, wherein, in response to a case where the default mode is used for the intra prediction of the current block, the intra prediction mode is determined to be the default mode, wherein, in response to a case where the default mode is not used for the intra prediction of the current block, the intra prediction mode is determined from a candidate group including a plurality of most probable mode (MPM) candidates, wherein the default mode is representative of a Planar mode, and wherein, in response to a case where the current block is partitioned into a plurality of sub-blocks, the intra prediction is sequentially performed in units of the sub-blocks and the plurality of sub-blocks belonging to the current block uses the same intra prediction mode for the intra prediction.

12. A non-transitory computer-readable storage medium for storing a bitstream generated by an image encoding method, the image encoding method comprising:

determining a current block by partitioning a coding block based on a tree-based block division;

determining an intra prediction mode of the current block; and performing intra prediction of the current block, wherein a prediction block of the current block is generated by performing the intra prediction based on the intra prediction mode, wherein a flag indicating whether a pre-defined default mode is used for the intra prediction of the current block is encoded into the bitstream, wherein, in response to a case where the default mode is used for the intra prediction of the current block, the intra prediction mode is determined to be the default mode, wherein, in response to a case where the default mode is not used for the intra prediction of the current block, the intra prediction mode is determined from a candidate group including a plurality of most probable mode (MPM) candidates, wherein the default mode is representative of a Planar mode, and wherein, in response to a case where the current block is partitioned into a plurality of sub-blocks, the intra prediction is sequentially performed in units of the sub-blocks and the plurality of sub-blocks belonging to the current block uses the same intra prediction mode for the intra prediction.

* * * * *